US007844730B2

(12) United States Patent
Kawaguchi

(10) Patent No.: US 7,844,730 B2
(45) Date of Patent: Nov. 30, 2010

(54) COMPUTER SYSTEM AND METHOD OF COMMUNICATION BETWEEN MODULES WITHIN COMPUTER SYSTEM

(75) Inventor: Shinichi Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 2027 days.

(21) Appl. No.: 10/061,242

(22) Filed: Feb. 4, 2002

(65) Prior Publication Data

US 2002/0107980 A1 Aug. 8, 2002

(30) Foreign Application Priority Data

Feb. 5, 2001 (JP) .............................. 2001-028268

(51) Int. Cl.
*G06F 15/173* (2006.01)
*G06F 11/00* (2006.01)
*H03M 13/00* (2006.01)

(52) U.S. Cl. .......................... 709/238; 709/239; 714/4; 714/776

(58) Field of Classification Search ................ 709/238, 709/239; 714/4, 776
See application file for complete search history.

(56) References Cited

U.S. PATENT DOCUMENTS

| | | | | |
|---|---|---|---|---|
| 5,812,773 | A * | 9/1998 | Norin | 709/204 |
| 6,480,502 | B1 * | 11/2002 | Abadi et al. | 370/432 |
| 6,496,477 | B1 * | 12/2002 | Perkins et al. | 370/228 |
| 6,574,770 | B1 * | 6/2003 | Daudelin | 714/776 |
| 6,704,278 | B1 * | 3/2004 | Albert et al. | 370/216 |
| 6,751,219 | B1 * | 6/2004 | Lipp et al. | 370/390 |
| 6,751,746 | B1 * | 6/2004 | Jain et al. | 714/4 |
| 2003/0048782 | A1 * | 3/2003 | Rogers et al. | 370/389 |
| 2004/0073933 | A1 * | 4/2004 | Gollnick et al. | 725/81 |

FOREIGN PATENT DOCUMENTS

| | | |
|---|---|---|
| EP | 0 381 334 A | 8/1990 |
| EP | 0 384 936 B1 | 9/1990 |
| EP | 0 963 082 A2 | 12/1999 |
| JP | S52-102645 A | 8/1977 |
| JP | S60-256861 A | 12/1985 |
| JP | H06-014056 A | 1/1994 |
| JP | H06-295278 A | 10/1994 |
| JP | H08-340348 A | 12/1996 |
| JP | H10-187585 A | 7/1998 |

OTHER PUBLICATIONS

Patent Abstracts of Japan, vol. 011, No. 065, Feb. 27, 1987 (corresponds to JPA 61-224640, published Oct. 6, 1986).

* cited by examiner

*Primary Examiner*—Philip C Lee
(74) *Attorney, Agent, or Firm*—Sughrue Mion, PLLC

(57) ABSTRACT

A computer system comprising a plurality of modules that transfer data in packets mutually, whose major feature is that each of the modules comprises an output controlling part for sending out a packet to transmit to the destination via each of a plurality of communication paths, and an input controlling part for receiving packets transmitted from a plurality of communication paths, identifying the identical packets transmitted from different communication paths, and capturing transmit data properly, wherein the input controlling part stores information for use for identifying the captured packets, identifies whether the packet received has already been captured or not, and newly captures a packet if the packet received is yet to be captured, and discards a packet if the packet received has already been captured.

11 Claims, 19 Drawing Sheets

COMPUTER SYSTEM AND METHOD OF COMMUNICATION BETWEEN MODULES WITHIN COMPUTER SYSTEM

BACKGROUNDS OF THE INVENTION

1. Field of the Invention

The present invention relates to a computer system. More particularly, the present invention relates to a computer system that transmits and receives data by packet transfer between modules that it incorporates, and a communication method therefor.

2. Description of the Related Art

FIG. 18 is a block diagram showing the configuration of a conventional computer system that transmits and receives data by packet transfer between a plurality of modules that it incorporates.

The computer system of FIG. 18 has a configuration, wherein CPU modules 20a shown in the block diagram of FIG. 19 and I/O modules 30a (IO modules) shown in the block diagram of FIG. 20 are connected on a one-to-one basis, and in which the CPU modules 20a are connected with one another via a module interconnect 40.

Referring to FIG. 19, the CPU module 20a comprises a CPU, a main memory, and a CPU module controller 21a for controlling transmission and reception of data between the CPU and the main memory. Referring to FIG. 20, the I/O module 30a comprises an I/O module controller 31a for controlling the function of bridging between itself and I/O adapters on the end.

Some conventional computer systems with similar configurations include additionally a swap function that allows any of the CPU modules 20a to be inserted or removed during system operation (i.e., hot swap function) in order to meet high availability requirements. Thanks to this function, if any of the CPU modules 20a fails, the system as a whole can avoid going down and allows the failing CPU module 20a to be replaced with a good one.

Conventional computer systems to which functions against failures as mentioned above are added, however, have one problem. Namely, in order to hot-swap a failing CPU module 20a, the I/O modules 30a under the failing CPU module 20a must also be removed even though they are operating normally and thus are available for connection for operation.

One conventional art to address this problem provides a computer system that is configured to connect a set of I/O modules 30a and a set of CPU modules 20a via a switching module 10, as illustrated in FIG. 21. By adopting such configuration, flexible connection between I/O modules 30a and CPU modules 20a can be realized. For example, when a failing CPU module 20a is disconnected from the system, the other CPU modules 20a can access the I/O modules 30a under the disconnected CPU module 20a by accessing through a switching module 10.

Similarly, as illustrated in FIG. 22, a large-scale computer system can be realized by connecting a set of CPU modules 20a and a set of I/O modules 30a via a network 50.

As described above, in conventional computer systems, a failure of a single or a small group of CPU modules 20a may often affect the functions throughout the system, making it difficult to realize high availability.

Similarly in conventional computer systems as illustrated in FIGS. 21 and 22, this problem tends to affect system-wide performance if a packet lost or data error occurs on the switching module 10 or the network 50. In CPU-I/O transactions, which is critical for systems to ensure normal operation, for example, some extreme cases have been reported in which an error in a single packet precluded the continuous operation of the entire system, causing a system down time.

The switching module 10 or the network 50 used in such a system suffers from a higher failure rate as the distance of connection becomes longer, suggesting that large-scale systems will encounter more failures attributable to these elements. Thus, in order to attain high availability, it is necessary to realize a new function that can ensure the continuous operation of the entire system even when a failure occurs along a path between modules.

SUMMARY OF THE INVENTION

An object of the present invention is to provide a computer system that can attain extremely high availability by resolving the above-mentioned drawbacks of conventional arts and multiplexing communication paths between modules, and a communication method for use between the modules thereof.

Another object of the present invention is to provide a computer system that can attain extremely high availability without sacrificing communication speed because each module captures the newest packets only by determining whether a packet received from a communication path is a new packet or not, and a communication method for use between the modules thereof.

A further another object of the present invention is to provide a computer system that can attain extremely high availability without needing to add some special new functions to its operation system, operation software, and/or other elements because software-level control, e.g., packet retransmission, is not required, and a communication method for use between the modules thereof.

According to the first aspect of the invention, a computer system that transfers data in packets mutually between a plurality of modules, comprises connecting between the plurality of modules via a plurality of multiplexed paths, wherein the module duplicates a packet into as many packets as the paths and outputs such packet duplicates to the paths, and selects the first-come packet among a plurality of the duplicate packets that have been input from a plurality of the paths.

In the preferred construction, the each of the modules comprises an output controlling part for duplicating a packet to transmit into as many packets as the paths and outputting such packet duplicates to the destination, and an input controlling part for identifying the duplicate packets that have been received from a plurality of the paths and selecting the packet that has arrived first only.

In another preferred construction, the module includes a CPU module and an I/O module that transfer data in packets mutually.

In another preferred construction, the output controlling part comprises a means for assigning to a packet to transmit identification information for identifying such packet uniquely, and a means for duplicating the packet with identification information into as many duplicate packets as the paths and outputting such duplicate packets, and the input controlling part comprises a selecting means for identifying the identification information of the packet received, receiving the first-come packet among the packets to which the same identification information has been assigned, and discarding the other packet.

In another preferred construction, the each of the modules comprises a means for detecting errors in the packets received from a plurality of the paths, and a means for detecting lost packets among the packets.

In another preferred construction, a switching module is provided between the modules for performing the switching of paths.

In another preferred construction, the modules are connected with one another via a communication network.

In another preferred construction, a plurality of the modules are connected directly via a plurality of the paths on a one-to-one basis.

According to the second aspect of the invention, a computer system that transfers data in packets between a plurality of modules, comprises
- connecting between the plurality of modules via a plurality of multiplexed paths, wherein
- the module to transmit the packet duplicates the packet into as many duplicate packets as the paths and outputs these duplicate packets to the paths, and
- the module to receive the packet selects the first-come packet among a plurality of the duplicate packets that have been input from a plurality of the paths, In the preferred construction, the each of the modules on the outputting side comprises an output controlling part for duplicating a packet to transmit into as many packets as the paths and outputting such packet duplicates to the destination, and
- the each of the modules on the inputting side comprises an input controlling part for identifying the duplicate packets that have been received from a plurality of the paths and selecting the packet that has arrived first only.

In another preferred construction, the output controlling part comprises a means for assigning to a packet to transmit identification information for identifying such packet uniquely, and a means for duplicating the packet with identification information into as many duplicate packets as the paths and outputting such duplicate packets, and
- the input controlling part comprises a selecting means for identifying the identification information of the packet received, receiving the first-come packet among the packets to which the same identification information has been assigned, and discarding the other packet.

In another preferred construction, a plurality of the modules are connected directly via a plurality of the paths on a one-to-one basis.

According to the third aspect of the invention, a communication method that transfers data in packets mutually between a plurality of modules within a computer system, comprising the steps of
- in the each of the modules
- duplicating a packet to transmit and sending out duplicate packets to the destination modules through a plurality of paths, and
- selecting the first-come packet among a plurality of the duplicate packets that have been input from a plurality of the paths.

In the preferred construction, in the each of the modules
- identifying the duplicate packets that have been received from a plurality of the paths and selecting the packet that has arrived first only.

In another preferred construction, in the module
- assigning to a packet to transmit identification information for identifying such packet uniquely,
- duplicating the packet with the identification information into as many duplicate packets as a plurality of paths and outputting such duplicate packets, and
- identifying the identification information of the packet received, receiving the first-come packet among the packets to which the same identification information has been assigned, and discarding the other packet.

In another preferred construction, in the each of the modules
- detecting errors in the packets received from a plurality of the paths and lost packets among the packets.

According to another aspect of the invention, an inter-module communication method that transfers data in packets between a plurality of modules, comprising the steps of
- in the plurality of modules connected via a plurality of multiplexed paths,
- the module to transmit the packet duplicating the packet into as many duplicate packets as the paths and outputting these duplicate packets to the paths, and
- the module to receive the packet selecting the first-come packet among a plurality of the duplicate packets that have been input from a plurality of the paths.

In the preferred construction, in the each of the modules on the outputting side
- duplicating a packet to transmit into as many packets as the paths and outputting such packet duplicates to the destination, and
- in the each of the modules on the inputting side
- identifying the duplicate packets that have been received from a plurality of the paths and selecting the packet that has arrived first only.

In another preferred construction, in the each of the modules on the outputting side
- assigning to a packet to transmit identification information for identifying such packet uniquely, duplicating the packet with identification information into as many duplicate packets as a plurality of paths and outputting such duplicate packets, and
- in the each of the modules on the inputting side
- identifying the identification information of the packet received, receiving the first-come packet among the packets to which the same identification information has been assigned, and discarding the other packet.

According to another aspect of the invention, a module of a computer that transfers data in packets mutually, comprises
- connecting between the plurality of modules via a plurality of multiplexed paths, and
- duplicating a packet into as many packets as the paths and outputting such packet duplicates to the paths, and
- selecting the first-come packet among a plurality of the duplicate packets that have been input from a plurality of the paths.

In the preferred construction, the module further comprises an output controlling part for duplicating a packet to transmit into as many packets as the paths and outputting such packet duplicates to the destination, and an input controlling part for identifying the duplicate packets that have been received from a plurality of the paths and selecting the packet that has arrived first only.

In another preferred construction, the output controlling part comprises a means for assigning to a packet to transmit identification information for identifying such packet uniquely, and a means for duplicating the packet with identification information into as many duplicate packets as the paths and outputting such duplicate packets, and
- the input controlling part comprises a selecting means for identifying the identification information of the packet received, receiving the first-come packet among the packets to which the same identification information has been assigned, and discarding the other packet.

In another preferred construction, the module includes a means for detecting errors in the packets received from a plurality of the paths, and a means for detecting lost packets among the packets.

According to a further aspect of the invention, a module of a computer system that transfers data in packets, comprises
connecting between the plurality of modules via a plurality of multiplexed paths,
the module to transmit the packet duplicating the packet into as many duplicate packets as the paths and outputting these duplicate packets to the paths, and
the module to receive the packet selecting the first-come packet among a plurality of the duplicate packets that have been input from a plurality of the paths.

In the preferred construction, the each of the modules on the outputting side comprises an output controlling part for duplicating a packet to transmit into as many packets as the paths and outputting such packet duplicates to the destination, and
the each of the modules on the inputting side comprises an input controlling part for identifying the duplicate packets that have been received from a plurality of the paths and selecting the packet that has arrived first only.

In another preferred construction, the output controlling part comprises a means for assigning to a packet to transmit identification information for identifying such packet uniquely, and a means for duplicating the packet with identification information into as many duplicate packets as the paths and outputting such duplicate packets, and
the input controlling part comprises a selecting means for identifying the identification information of the packet received, receiving the first-come packet among the packets to which the same identification information has been assigned, and discarding the other packet.

In another preferred construction, a plurality of the modules are connected directly via a plurality of the paths on a one-to-one basis.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
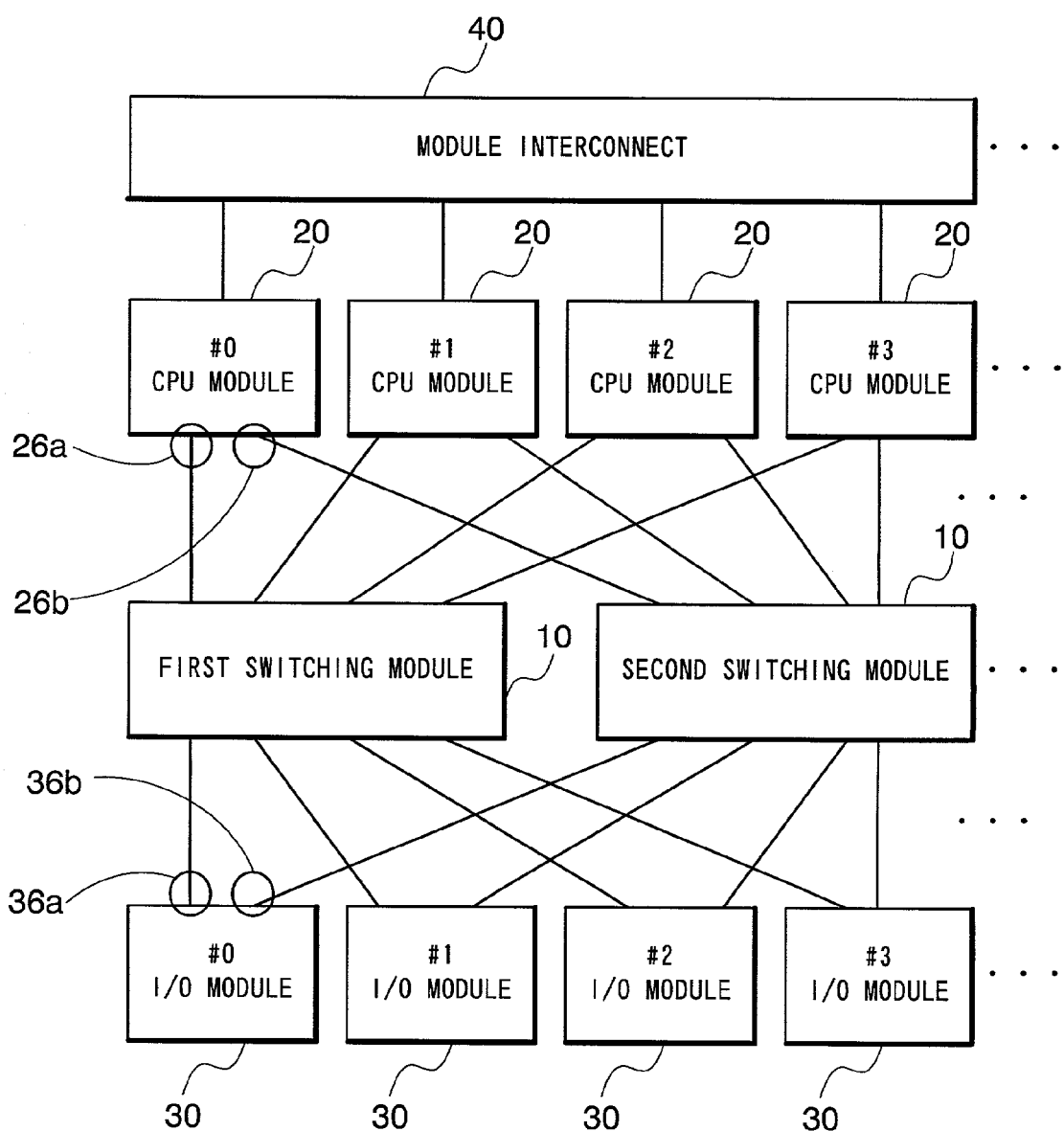
FIG. 1 is a block diagram showing the configuration of a computer system according to the first embodiment of the present invention.

FIG. 1 is a block diagram showing the configuration of a computer system according to the first embodiment of the present invention, wherein a plurality of CPU modules 20 are connected with a plurality of I/O modules 30 (I/O modules) via a switching module 10. The CPU modules 20 are connected with one another via a module interconnect 40. The above-mentioned CPU modules 20, I/O modules 30, and the switching modules 10 may be, for example, built in separate cabinets individually.

A major feature of the present embodiment is that high availability is realized by multiplexing transfer of data packets between the CPU modules 20 and the I/O modules 30 within the computer system into a plurality of communication paths. Let us denote hereinafter modules that transmit and receive packets by using these multiplexed paths (i.e., CPU modules 20 and I/O modules 30) "high availability modules." While the present invention requires that the I/O ports of CPU modules 20 and I/O modules are multiplexed, the recent advance of device technology has made it possible to multiplex these I/O ports without increasing the number of parts.

In descriptions below, communication according to the present embodiment will be described by taking a particular example, wherein a path between a CPU module 20 and an I/O module 30 is multiplexed into two communication paths by providing two switching modules 10. However, the communication method as described below can be realized regardless of the number of paths into which a communication path is multiplexed (i.e., the number of switching modules 10). Furthermore, any number of CPU modules 20 or I/O modules 30 can be provided to realize the communication method of the present embodiment.

Figure 2:
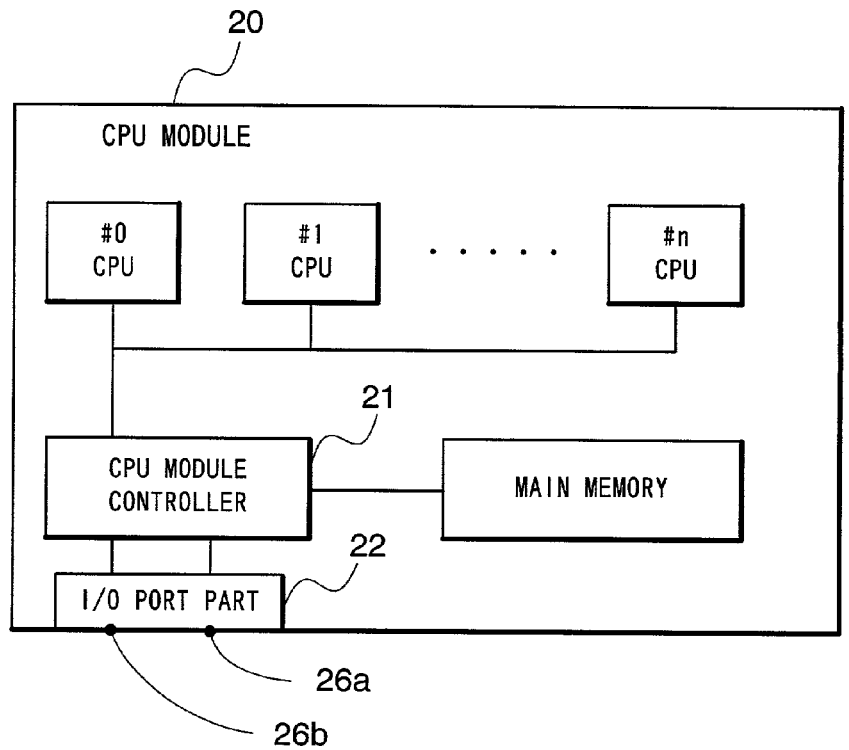
FIG. 2 is a block diagram showing the configuration of a CPU module according to the first embodiment of the present invention.
Figure 3:
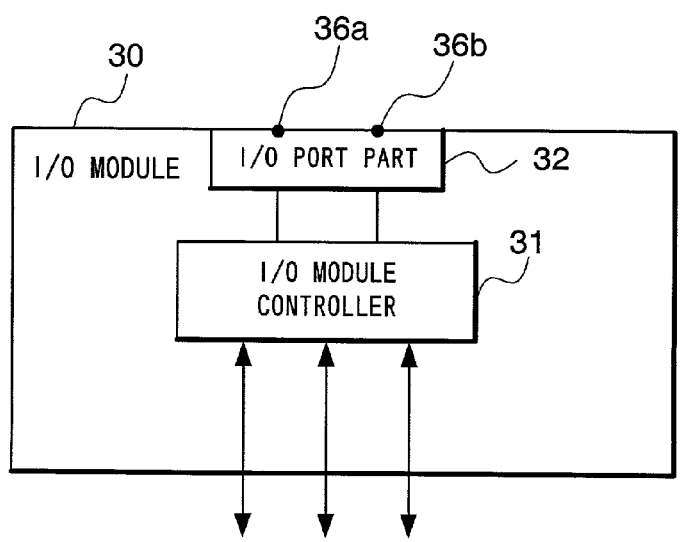
FIG. 3 is a block diagram showing the configuration of the I/O module of the first embodiment of the present invention.

FIG. 2 is a block diagram showing the configuration of the CPU module 20 of the present embodiment. FIG. 3 is a block diagram showing the configuration of the I/O module 30 of the present embodiment.

The CPU module 20 of the present embodiment incorporates several CPUs and main memories, along with a module controller 21 to control data passing to these components. The module controller 21 is provided with two I/O ports, i.e., a first I/O port and a second I/O port, which are connected to a first switching module 10 and a second switching module 10, respectively.

The I/O module 30 of the present embodiment comprises an I/O module controller 31, which has the function of bridging between itself and an I/O adapter on the end. Similarly, the I/O module controller 31 has a first I/O port and a second I/O port, which are connected to a first switching module 10 and a second switching module 10, respectively.

As shown in FIG. 1, each of the CPU modules 20 and each of the I/O modules 30 are connected with each other at each of the I/O port parts 22, 32 via the switching module 10. For example, the first I/O port 26a of each CPU module 20 is connected to the first I/O port 36a of each I/O module 30 via the first switching module 10, and the second I/O port 26b of each CPU module 20 is connected to the second I/O port 36b of each I/O module 30 via the second switching module 10.

The switching module 10 is a module for switching packets that are transmitted and received between each of the CPU modules 20 and each of the I/O modules 30. A packet herein refers to a unit of data, which is made up of data to be transmitted or received between a CPU module 20 and an I/O module 30 and additional information concerning the destination. Examples of the contents of data transmitted or received in a packet include data read requests, write data requests, and response data to data read requests.

By having packets first go through the switching module 10, it becomes possible to transfer packets from any CPU module 20 to any I/O module 30. Similarly, it becomes possible to transfer packets from any I/O module 30 to any CPU module 20.

In the example of FIG. 1, the CPU modules 20 correspond to the I/O modules 30 on a one-to-one basis, and packet transfer from any CPU module 20 to any I/O module 30 is achieved by always having all the packets first go through the module interconnect 40 and then through the CPU module 20 corresponding to the target I/O module 30. For example, in FIG. 1, #0 CPU module 20 corresponds to #0 I/O module 30. In case where a packet is issued from #3 CPU module 20 to #0 I/O module 30, the packet is first transferred to #0 CPU module 20 via the module interconnect 40, and then sent from #0 CPU module 20 to #0 I/O module 30.

Likewise, packet transfer from an I/O module 30 to a CPU module 20 is done by having a packet first go through the CPU module 20 corresponding to the source I/O module 30 and then through the module interconnect 40 before transferring it to the destination CPU module 20. For example, in FIG. 1, when transferring a packet from #1 I/O module 30 to #2 CPU module 20, the packet is first transmitted via the switching module 10 to #1 CPU modules 20 and then sent from #1 CPU module 20 to #2 CPU module 20 via the module interconnect 40.

Thus, in a path using switching modules 10 as intermediates, the source and the destination correspond to each other on a one-to-one basis. This method is commonly used as an I/O access procedure for multi-processor systems because strong ordering in a software-based ordering model is guaranteed on a system-wide basis.

Figure 10:
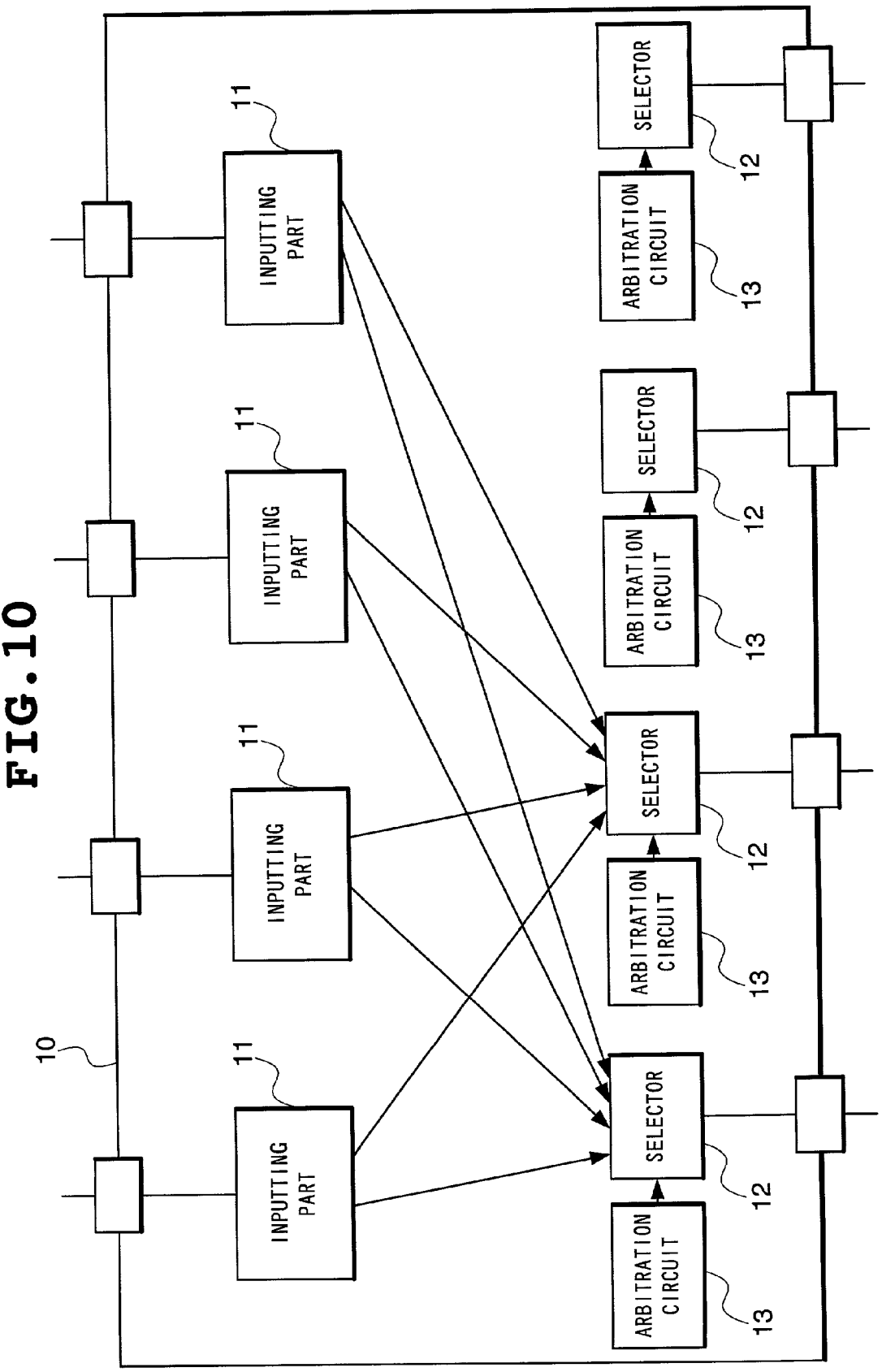
FIG. 10 is a block diagram showing a sample configuration of the switching module of the present invention.

FIG. 10 shows a sample configuration of the above-mentioned switching module 10. In FIG. 10, the switching module 10 comprises an inputting part 11 which consists of a FIFO buffer for inputting packets sent from CPU modules 20 or I/O modules 30, a selector 12 for outputting packets that have been input into a pre-determined CPU module 20 or I/O module 30, and an arbitration circuit 13 for controlling the switching of the selector 12.

Figure 4:
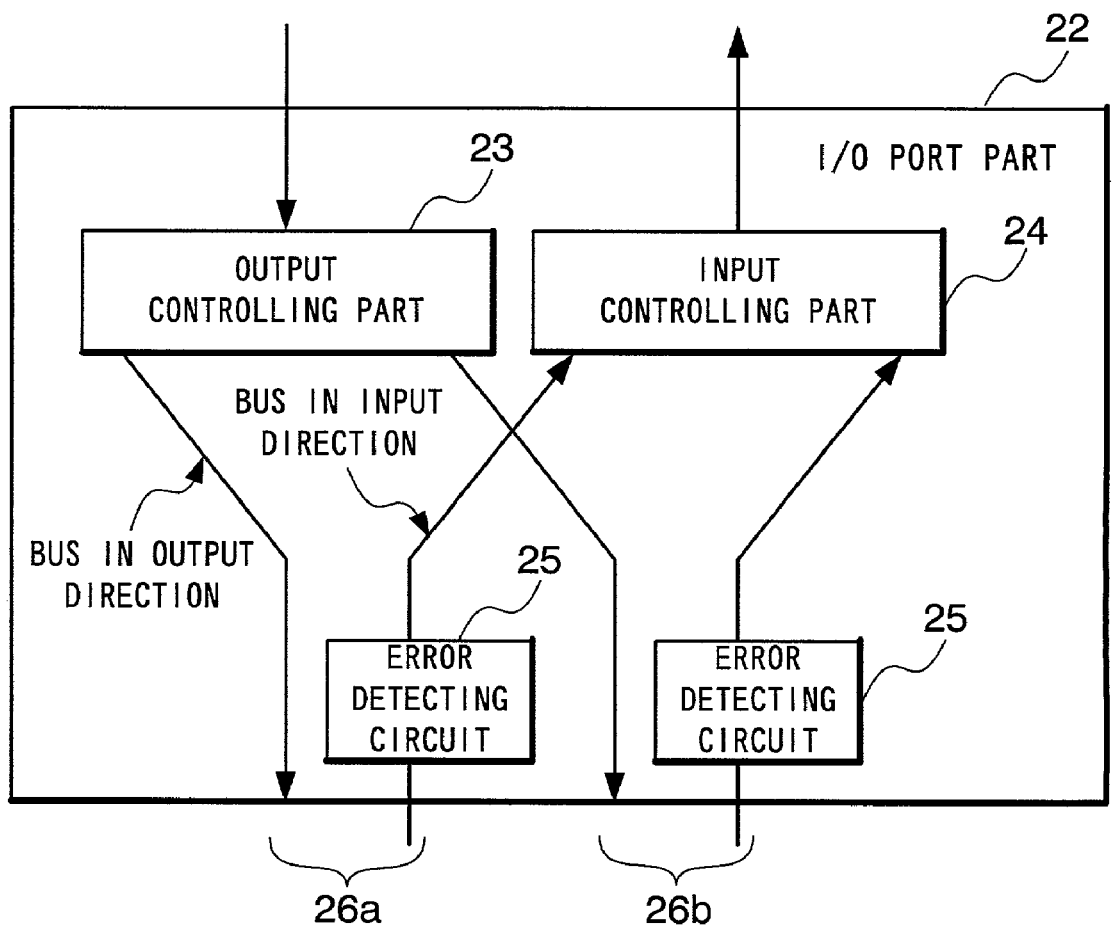
FIG. 4 is a block diagram showing the configuration of the I/O port part of the first embodiment of the present invention.

FIG. 4 is a block diagram showing the configuration of the I/O port part 22 provided in each of the CPU modules 20 of the first embodiment of the present invention. The I/O port part has paths in two directions: input and output directions. The configuration of the I/O port part 32 on the I/O module 30 side is the same as that of the above-mentioned I/O port part 22.

Input packets that are input from two sets of a first I/O port and a second I/O port 26a, 26b (36a, 36b) are input into the input controlling part 24, and then input into the internal circuit of the CPU module controller 21 (or the I/O module controller 31) via the input controlling part 24.

Output packets from the same internal circuit of the CPU module controller are output to the first and second I/O ports 26a, 26b (36a, 36b) via the output controlling part 23, respectively.

Figure 5:
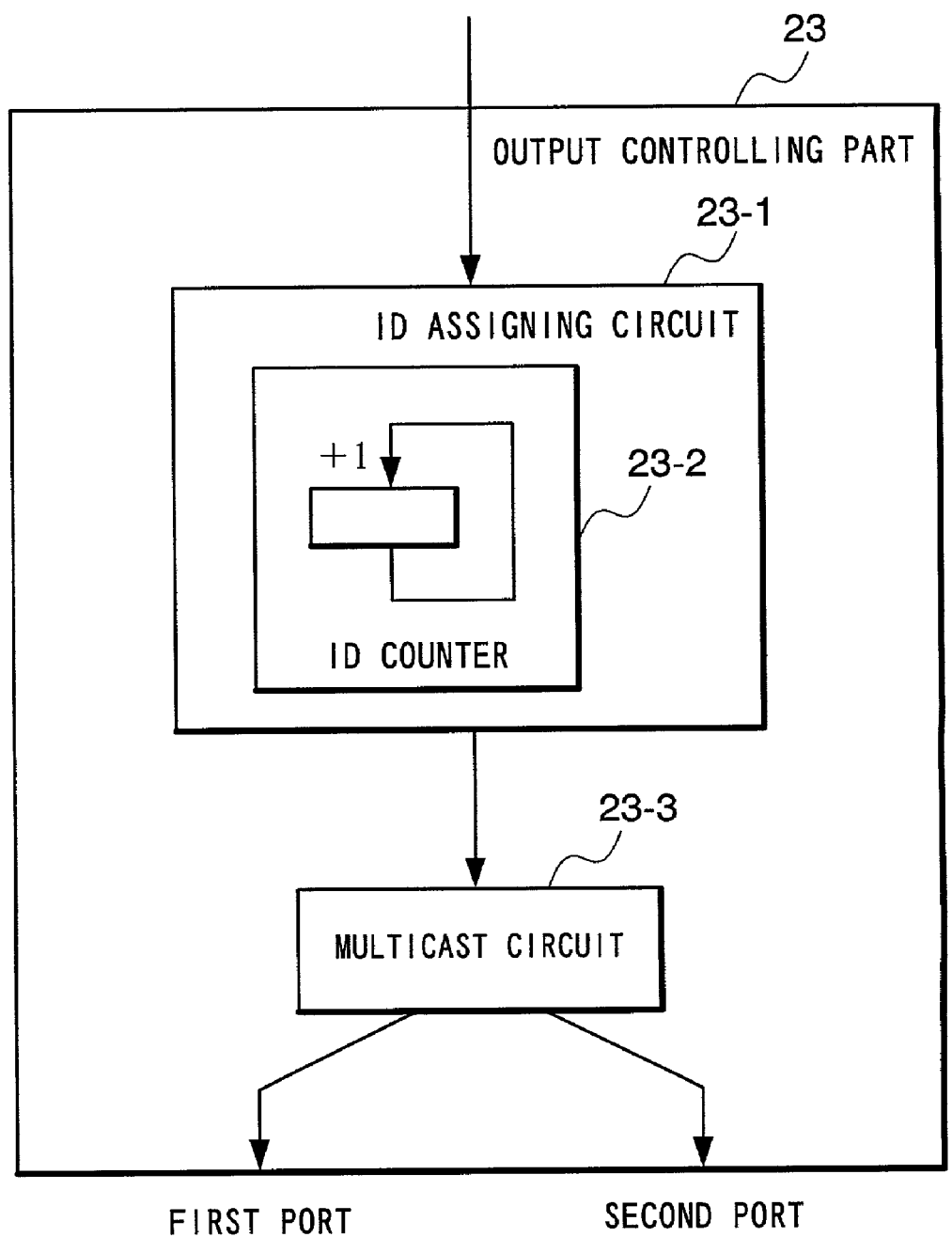
FIG. 5 is a block diagram showing the configuration of the output controlling part of the first embodiment of the present invention.

FIG. 5 is a block diagram showing the configuration of the output controlling part 23 of the present embodiment. The configuration of the output controlling part is common between the CPU modules 20 and the I/O modules 30.

The output controlling part 23 is provided with an ID assigning circuit 23-1 for assigning sequential numbers to packets that are sent from the internal circuit of the CPU module controller 21 (or the internal circuit of the I/O module controller 31) in order to identify these packets uniquely, and a multicast circuit 23-3 for duplicating each of the packets with IDs that have been output from the ID assigning circuit 23-1 and then transmitting these duplicate packets to the first and second I/O ports 26a, 26b (36a, 36b).

The value of the ID counter, which is a number to be assigned by the ID assigning circuit 23-1, is incremented every time a packet is sent in ascending order, 0→1→2→3→ . . . n, and then returned to "0" after reaching a pre-determined value "n."

Figure 6:
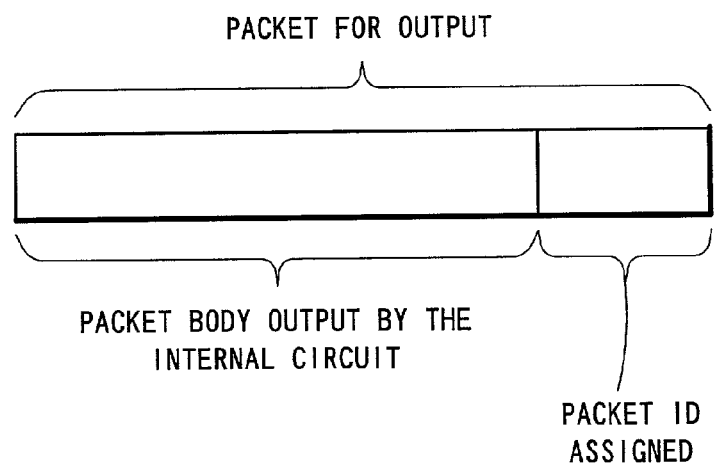
FIG. 6 is a diagram showing a sample configuration of a packet that is transmitted or received between the modules of the computer system according to the first embodiment of the present invention.

FIG. 6 is a diagram showing a sample configuration of a packet that is transmitted or received between the modules of the computer system according to the present embodiment. In the sample configuration of FIG. 6, a packet to be output from the port part of FIG. 5 is formed by adding a packet ID to the packet sent from the internal circuit of the CPU module controller 21 (or the internal circuit of the I/O module controller 31). This packet ID represents the value of the ID counter described above and is used for identifying this particular packet on the receiving module.

Figure 7:
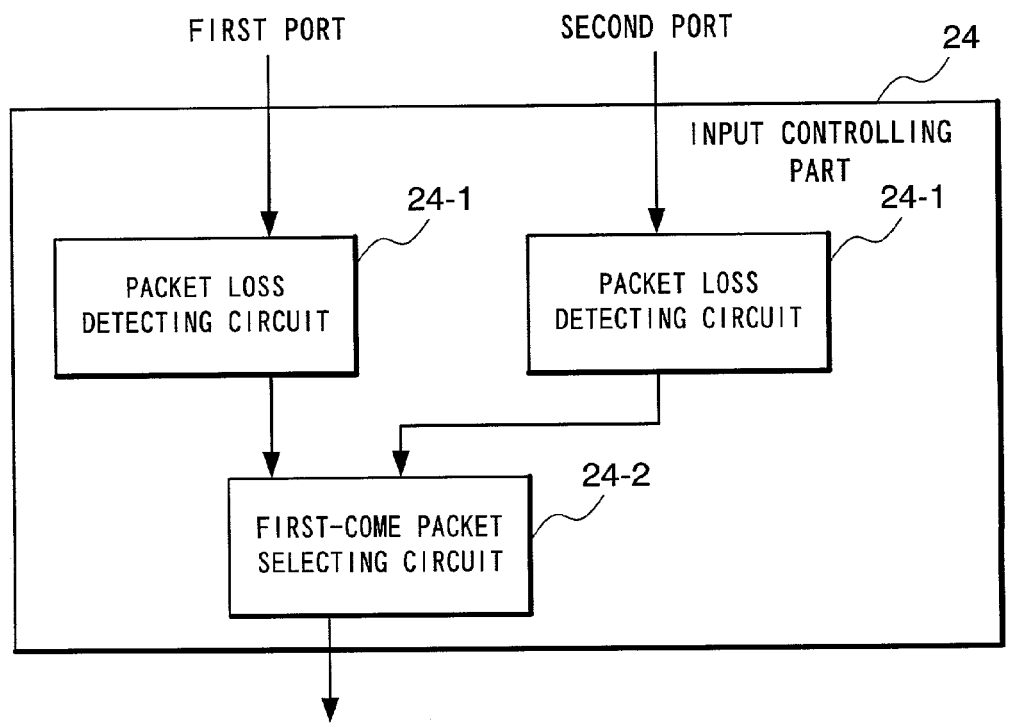
FIG. 7 is a block diagram showing the configuration of the input controlling part of the first embodiment of the present invention.

FIG. 7 is a block diagram showing the configuration of the input controlling part 24 of the present embodiment. The configuration of the input controlling part is common between the CPU modules 20 and the I/O modules 30.

Packets received at the ports are input into the packet loss detecting circuits 24-1 of the respective ports. All output from each of the packet loss detecting circuits 24-1 is then input into the first-come packet selector circuit 24-2. The packets that are output from this first-come packet selector circuit 24-2 are ultimately input into the internal circuit of the CPU module controller 21 (or I/O module controller 31).

Figure 8:
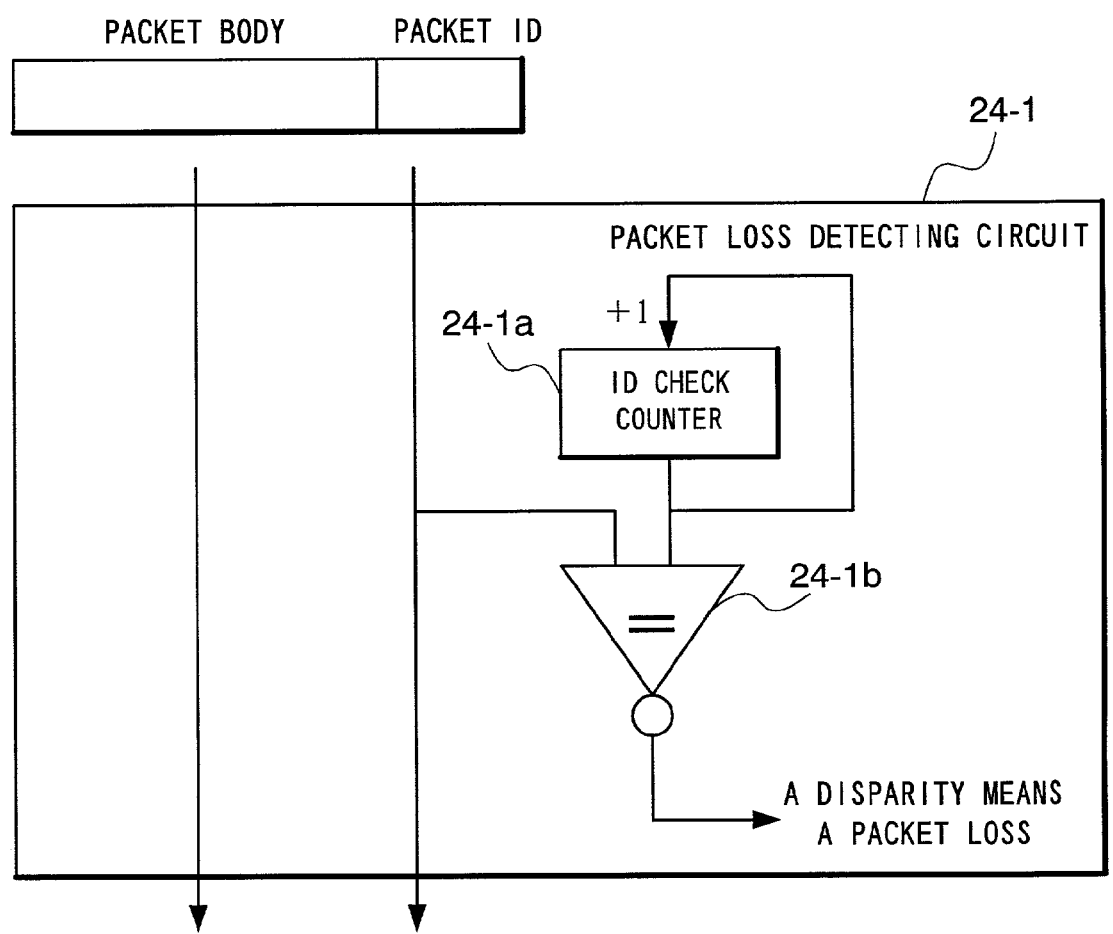
FIG. 8 is a block diagram showing the configuration of the packet loss detecting circuit of the first embodiment of the present invention.

FIG. 8 is a block diagram showing the configuration of the packet loss detecting circuit 24-1 of the present embodiment. Each packet loss detecting circuit 24-1 of the input controlling part 24 is provided with an ID check counter 24-1$a$ which increments in ascending order, $0 \to 1 \to 2 \to 3 \to \ldots n \to 0$, and a packet ID comparing circuit 24-1$b$, as shown in FIG. 8, to compare the value of the ID check counter 24-1$a$ against the packet ID assigned by each source to the transmission packet at the time of outputting from the port.

If a packet should be lost somewhere along the path, a disparity will occur between the packet ID received and the value of the ID check counter, allowing the packet loss detecting circuit 24-1 to detect a packet loss. To enable this detection, the packet ID to be sent initially by the source and the initial value of the ID check counter 24-1$a$ will be made to be the same. The packet loss detecting circuit 24-1 described above may be provided on the switching module 10 side.

Figure 9:
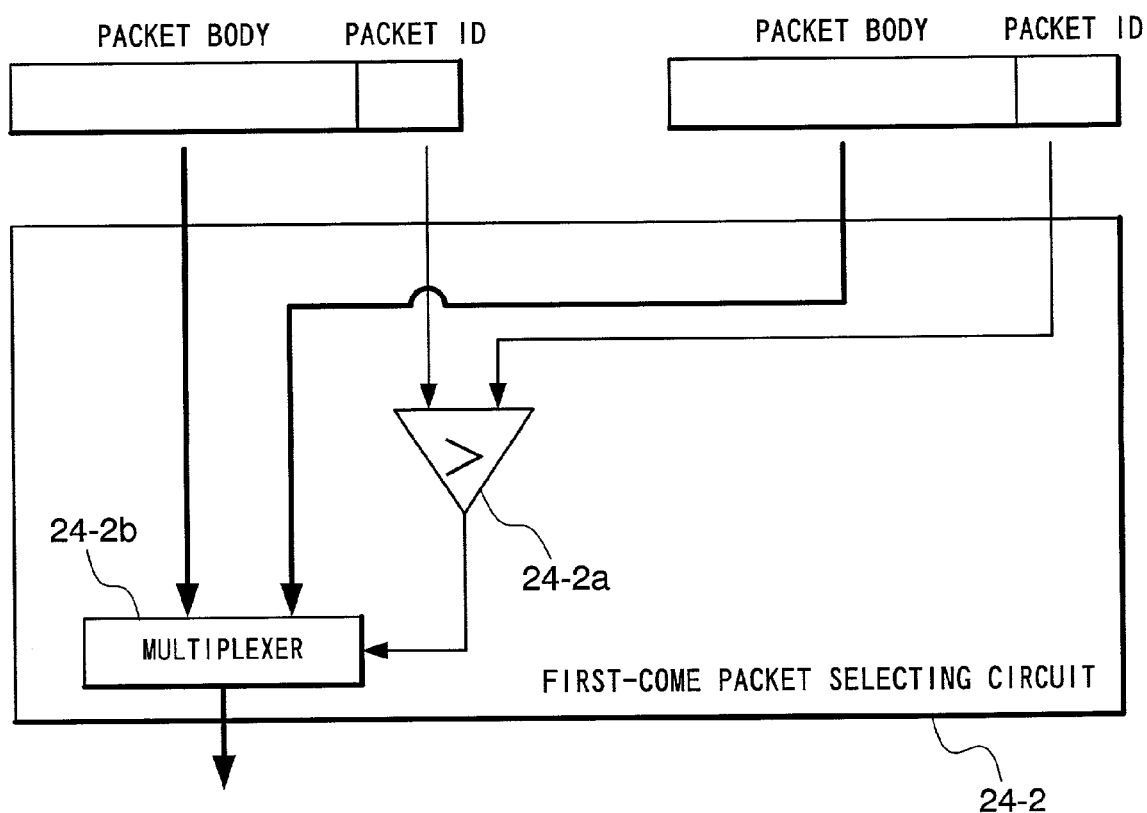
FIG. 9 is a block diagram showing the configuration of the first-come packet selector circuit of the first embodiment of the present invention.

FIG. 9 is a block diagram showing the configuration of the first-come packet selector circuit 24-2 of the present embodiment. As shown in FIG. 9, the first-come packet selector circuit 24-2 of the input controlling part 24 uses the packet ID comparing circuit 24-2$a$ to detect the value of the packet ID (ID counter) assigned to the packet that has been input from the respective first and second I/O ports 36$a$, 36$b$, and compares the ID against the value of the counter. Based on the result, it determines which flow of packets is ahead between the two paths by use of the multiplexer 24-2$b$, and captures a packet from the port on the forward path side.

In other words, a packet is duplicated by the multicast circuit 23-3 of the output controlling part 23 of the source, which sends out the resulting duplicates simultaneously to a plurality of paths. These duplicates are thus to move along their respective paths. Since the duplicates of the packet will move forward differently through the respective paths, a certain time lag will occur between these duplicates before they ultimately reach the input controlling part of the respective destinations. The first-come packet selector circuit 24-2 detects this time lag and determines which duplicate packet has arrived earlier. It selects the packet that has arrived first among the identical packets received from the respective ports and discards the packets that have arrived later in time sequence.

The processing of communication between the modules within the computer system of the present embodiment will now be described in detail with reference to the drawings.

Figure 11:
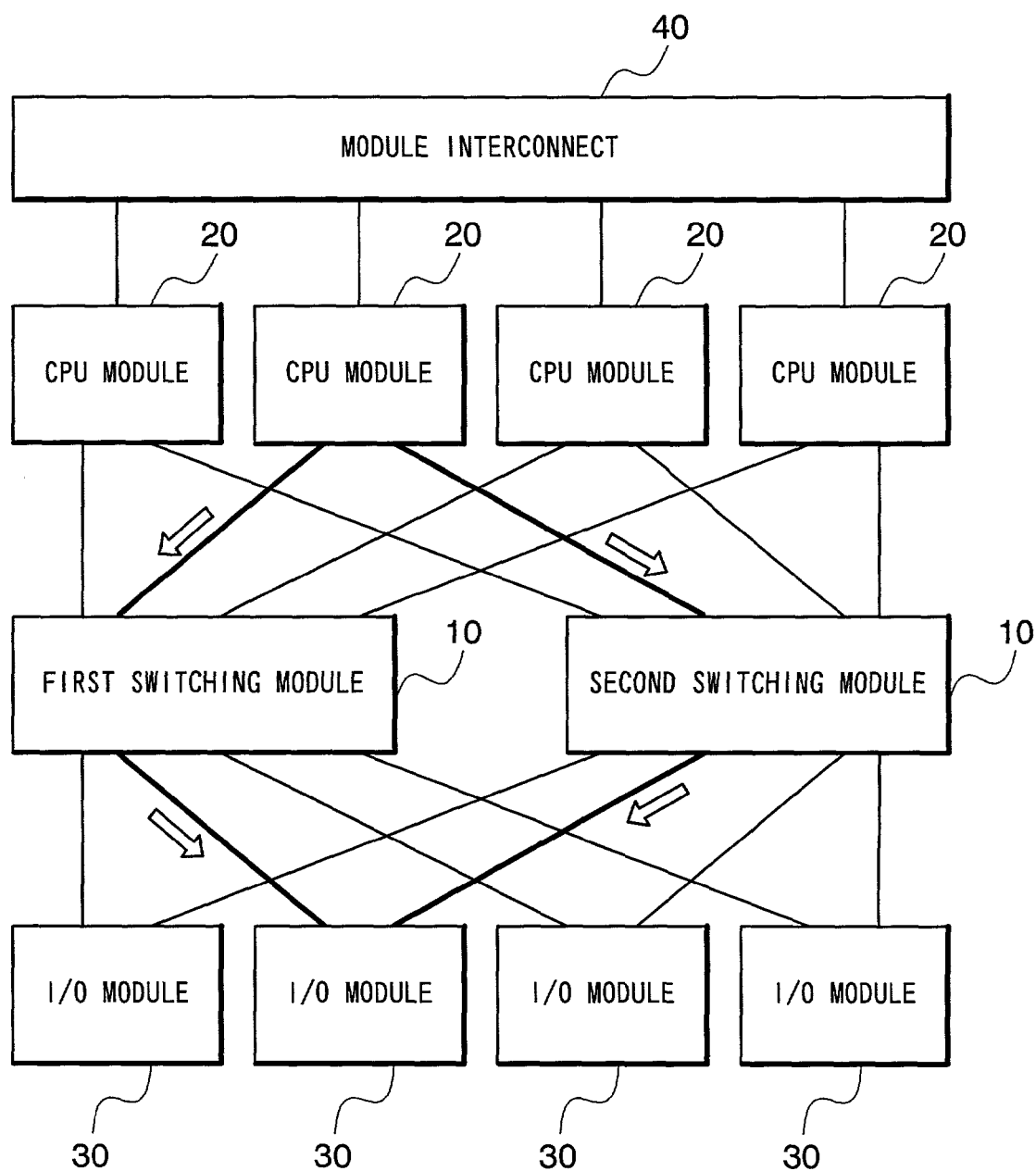
FIG. 11 is a diagram for explaining packet transfer between the modules of the computer system according to the first embodiment of the present invention.
Figure 12:
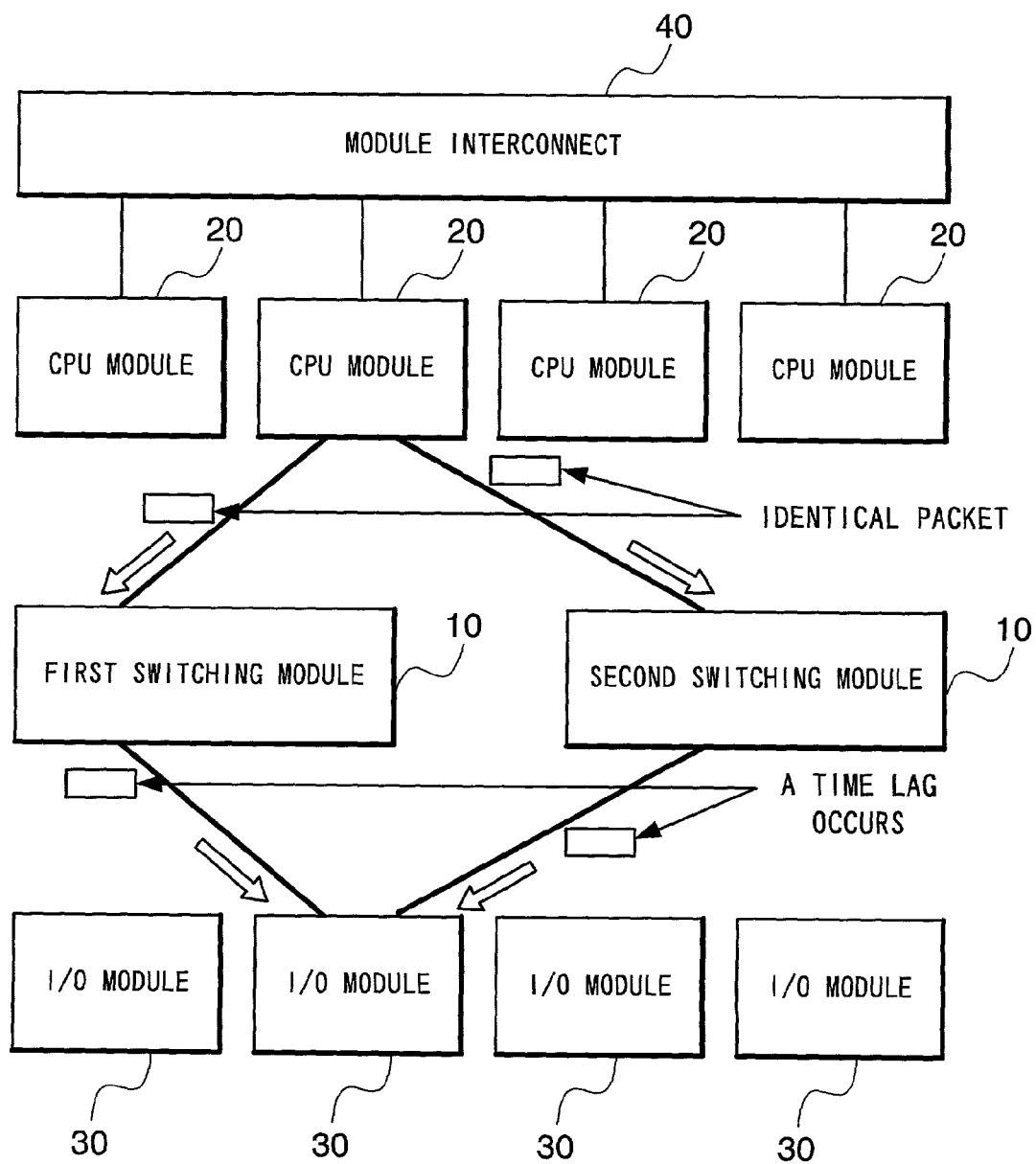
FIG. 12 is a diagram for explaining packet transfer between the modules of the computer system according to the first embodiment of the present invention.

According to the foregoing, each of the CPU modules 20 and each of the I/O modules 30 are connected via two completely separate paths (FIG. 11). They transmit two identical packets to the two ports, using the multicast circuit 23-3 on the initiating module (FIG. 12).

The packets flowing through the respective paths inevitably move forward differently under the influence of various factors, including different degrees of congestion within the individual paths and deteriorated latencies as a result of actions taken to correct errors, if any. Such influence leads to a certain time lag between the identical packets by the time they reach the receiving module.

Figure 13:
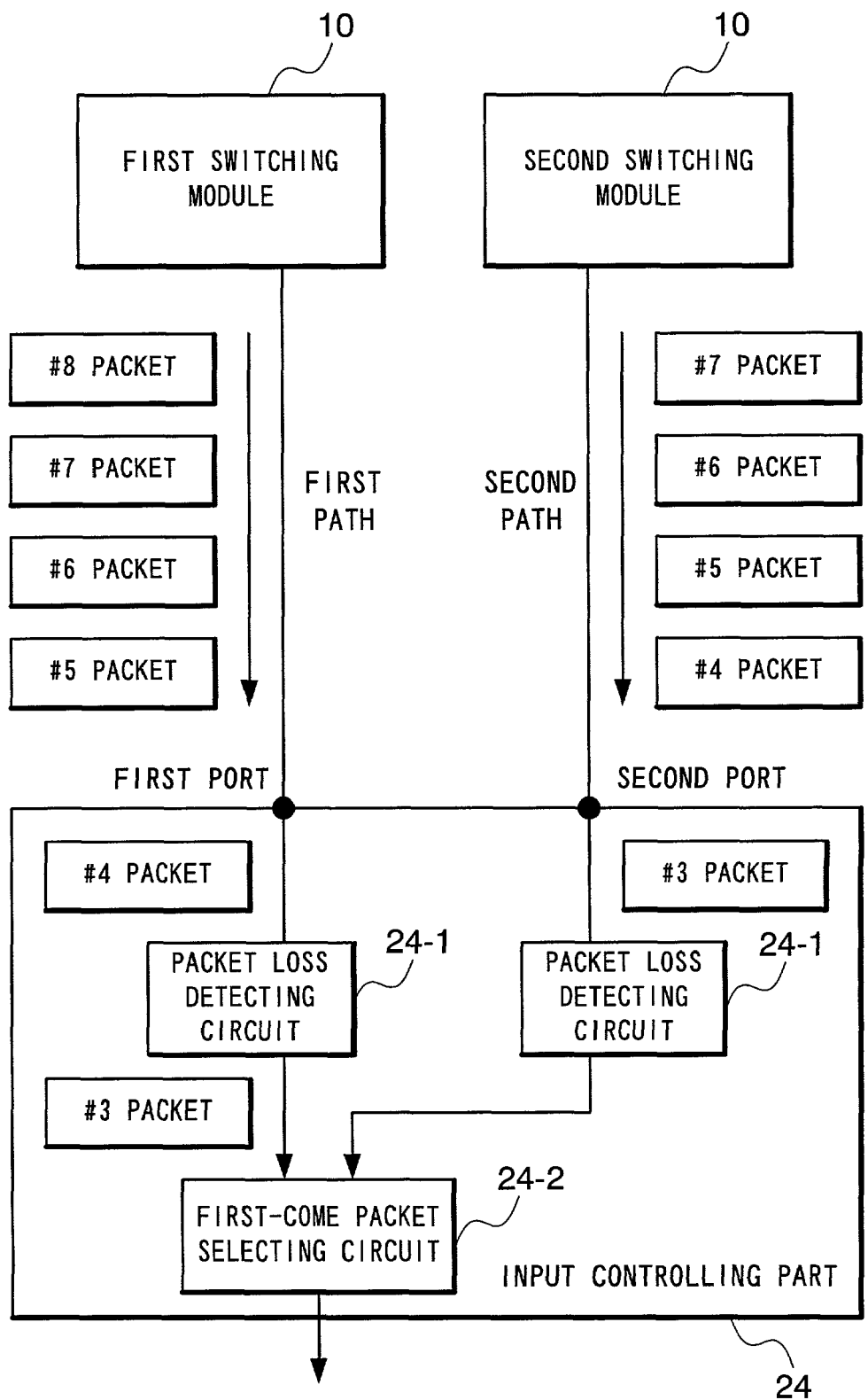
FIG. 13 is a diagram for explaining packet transfer between the modules of the computer system according to the first embodiment of the present invention.

For example, referring to the example of FIG. 13, which shows a state of packet transmission, #3 packet on the first path arrives at the receiving module earlier than #3 packet on the second path.

The receiving module checks each packet for error upon receipt from each of the ports, using the error detecting circuit 25.

The receiving module checks the packets for packet loss using the packet loss detecting circuit 24-1, and then controls to actually receive the packet that arrived earlier among the packets sent through the respective paths using the first-come packet selector circuit 24-2.

Following this, the identical packet, which has been received later from the path that is different from the one from which the first-come packet was received, is actually received and checked for error for network diagnosis purposes by the error detecting circuit 25 and the packet loss detecting circuit 24-1, and is then discarded by the first-come packet selector circuit 24-2.

In the example of FIG. 13, #3 packet on the first path is selected and #3 packet on the second path is discarded.

Thus, by providing multiplexed (or duplexed) communication paths, transmitting identical packets along these paths separately, and adopting the first-come packet and discarding the packet arriving later on the receiving side, it becomes possible to ensure the continuous operation of the system without risk of losing packets because, even if either of the paths should fail or an error should occur in a packet flowing either of the paths, the packet arriving from the other path can be adopted.

Furthermore, an embodiment is also possible that, for example, performs a pre-set error handling procedure, wherein, if, for example, a packet loss or non-correctable bit error is detected upon receipt of a particular first-come packet, the system discards the packet; suspends packet transmission through the path in which the error was detected by issuing a busy signal or the like from the switching module of FIG. 1 or other circuit in a preceding stage; waits for a duplicate packet with the same packet ID to arrive through the other network; captures this packet upon arrival and, at the same time, releases the busy signal that has been suspending the path in which the error was detected; and resumes the dual-path operation mode.

Figure 14:
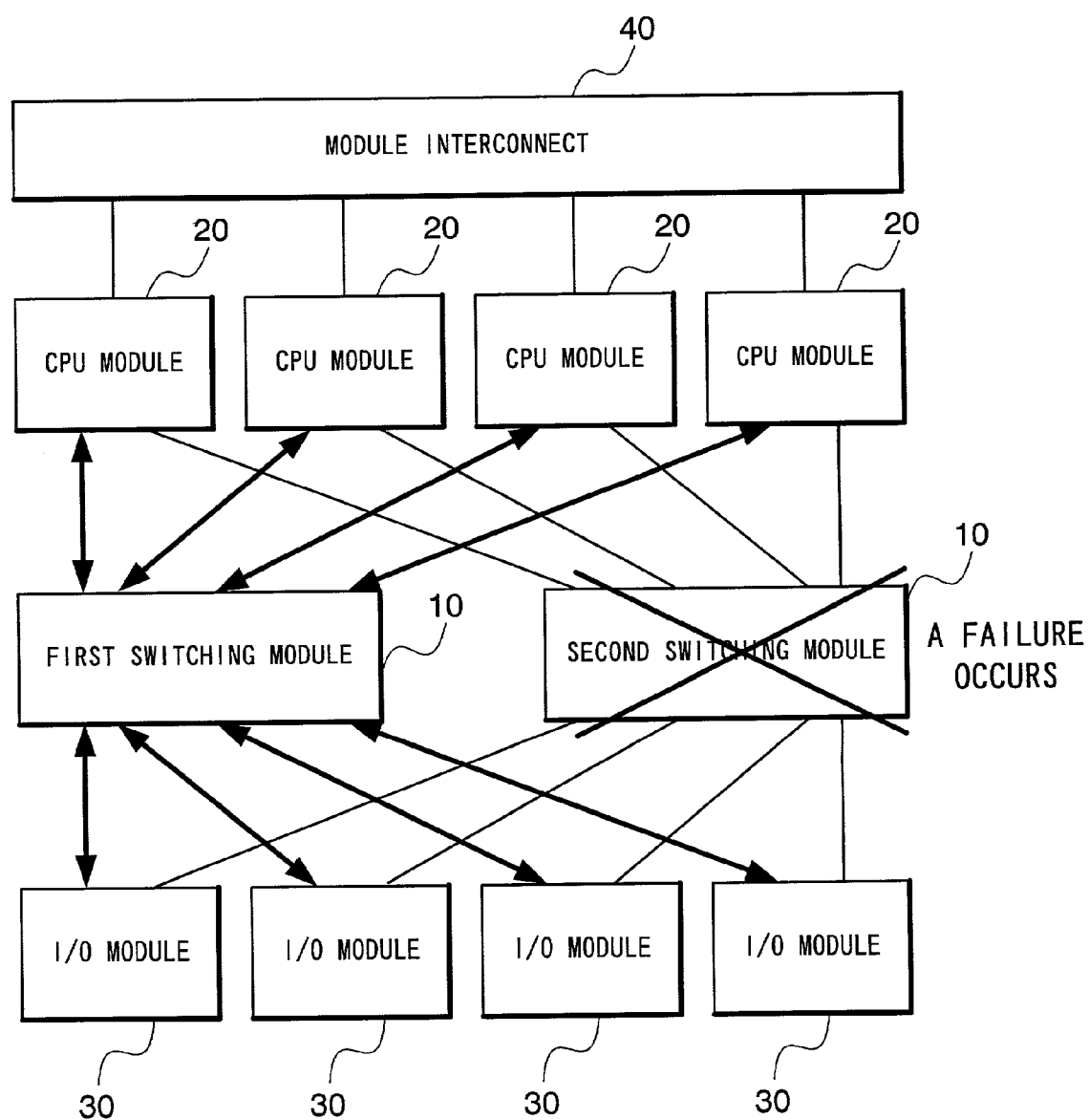
FIG. 14 is a diagram for explaining packet transfer between the modules of the computer system according to the first embodiment of the present invention.

The system logs errors that it detects, and if the log reveals that errors occur frequently in packets from one particular network, it disconnects that path and shifts to the single-path operation mode using the path that is currently operating normally only, as shown in FIG. 14.

If an error is detected in the packet received later, this packet is discarded as is the case with normal times, since an identical packet has already arrived and been captured by the receiving module. The system logs the event, i.e., an error was detected in a packet received through this path. If a particular network experiences frequent packet errors during subsequent operation, that path will be disconnected similarly to the foregoing.

The second embodiment of the present invention will now be described.

In contrast to the previous embodiment with a configuration, wherein the output controlling part 23 assigns an ID to a packet and, using the multicast circuit 23-3, duplicates a packet with ID and transmits these packets (duplicates) to the first and second I/O ports 26$a$, 26$b$ (36$a$, 36$b$), the second embodiment has a configuration, wherein the output controlling part 23 is provided with a multicast circuit 23-3 only, and duplicates a packet from a CPU module 20 or an I/O module 30 as is, without assigning an ID and transmits them to the first and second I/O ports 26a, 26b (36a, 36b). Accordingly, this configuration is not provided with the packet loss detecting circuit 24-1 of the input controlling part 24 nor does it have the packet ID comparing circuit 24-2a of the first-come packet selector circuit 24-2.

Since this second embodiment does not check packet IDs, it selects the first-come packet and discards the other by having the first-come packet selector circuit reference the header information regarding a pair of packets that have been transmitted via the first and second I/O ports 26a, 26b (36a, 36b). Further details will be omitted since the rest of the configuration is the same as the first embodiment above.

Figure 15:
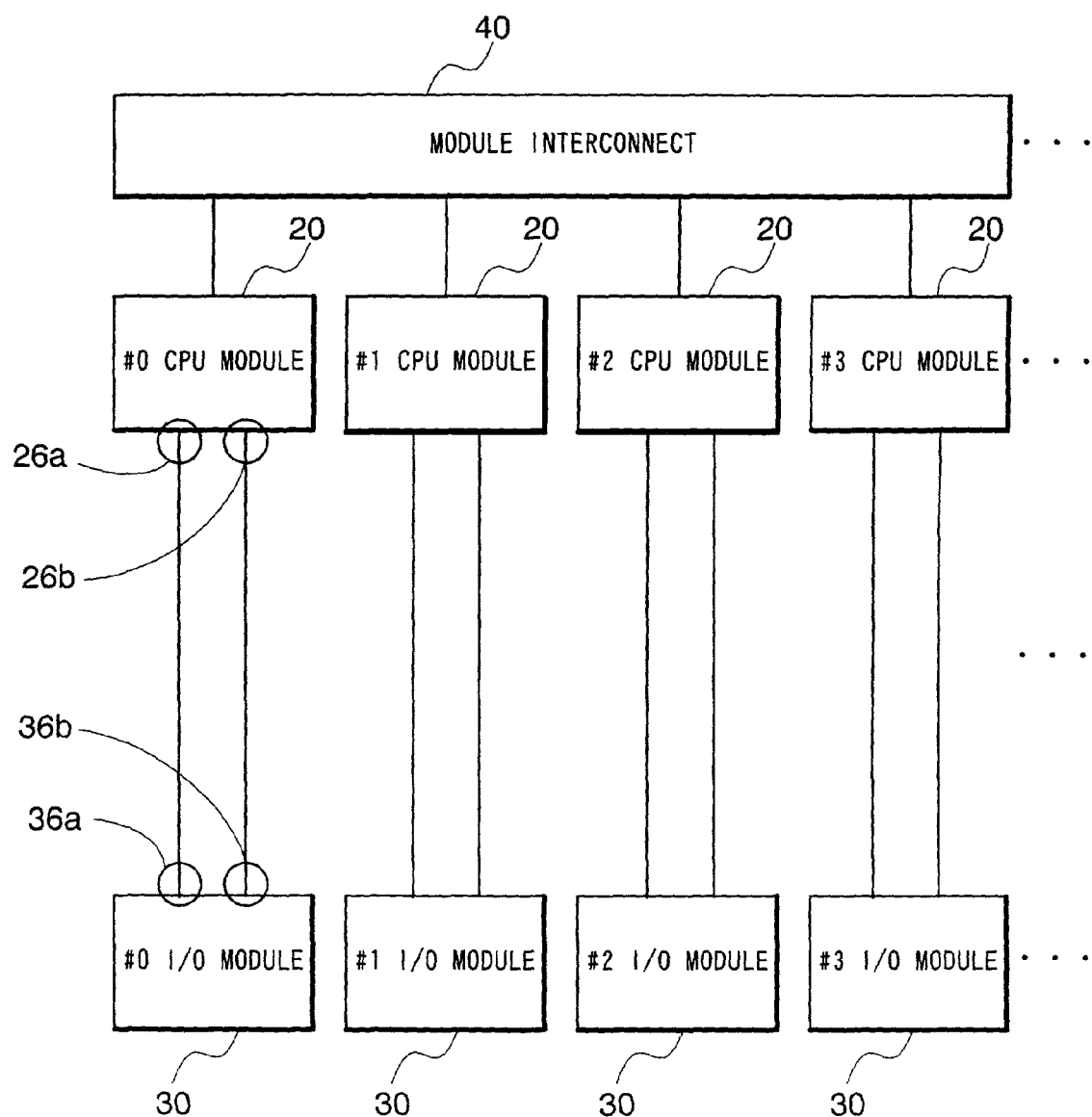
FIG. 15 is a block diagram showing the configuration of a computer system according to the third embodiment of the present invention.

The third embodiment of the present invention will now be described with reference to FIG. 15.

The third embodiment is configured such that a CPU module 20 and the corresponding I/O module 30 are connected directly by linking between first input ports and between second input ports, without being intermediated by the switching module 10. The components of the CPU module 20 and the I/O module 30 of the third embodiment are the same as those of the first embodiment shown in FIG. 1. In terms of operation as well, the third embodiment is identical to the first embodiment, except that it does not use the switching module 10 as an intermediate, and works similarly to the first embodiment with similar effects.

Now yet other embodiments of the present invention will be described with reference to FIGS. 16 and 17.

Figure 16:
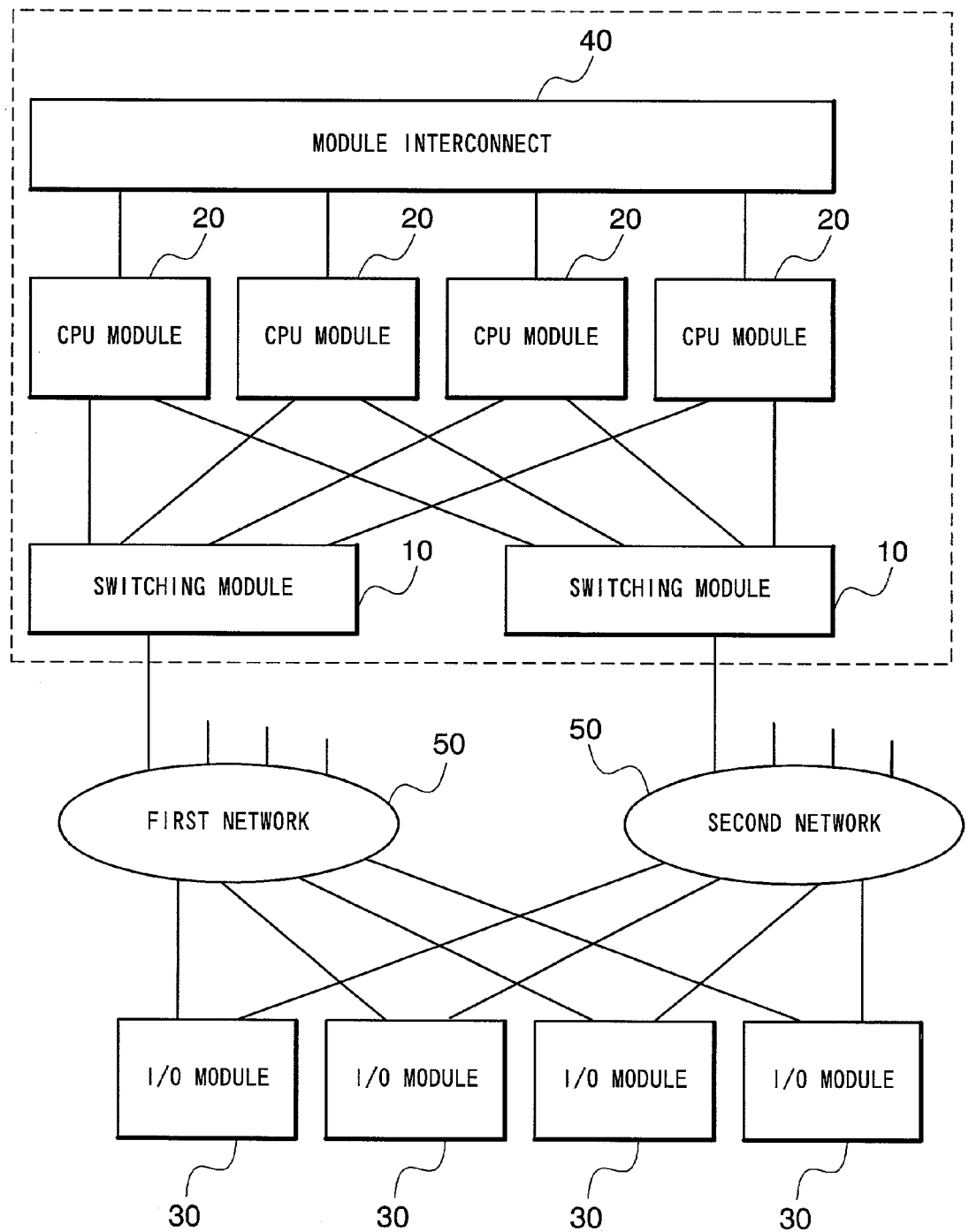
FIG. 16 is a block diagram showing the configuration of a computer system according to other embodiment of the present invention.

As shown in FIG. 16, the present invention can similarly be applied to a large-scale system, wherein many CPU modules 20 are connected to many I/O modules 30 via networks 50.

Figure 17:
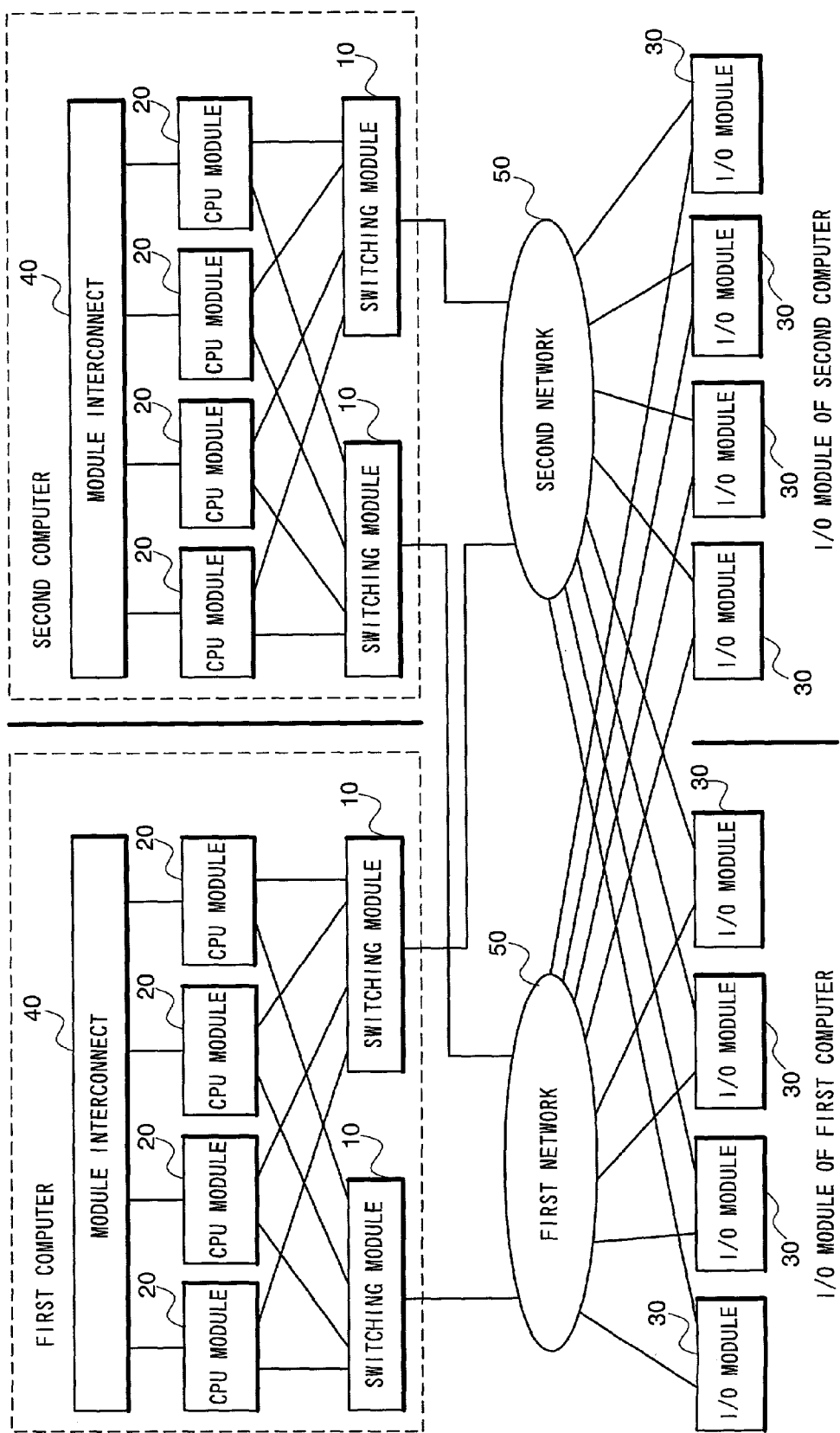
FIG. 17 is a block diagram showing the configuration of a computer system according to yet other embodiment of the present invention.
Figure 18:
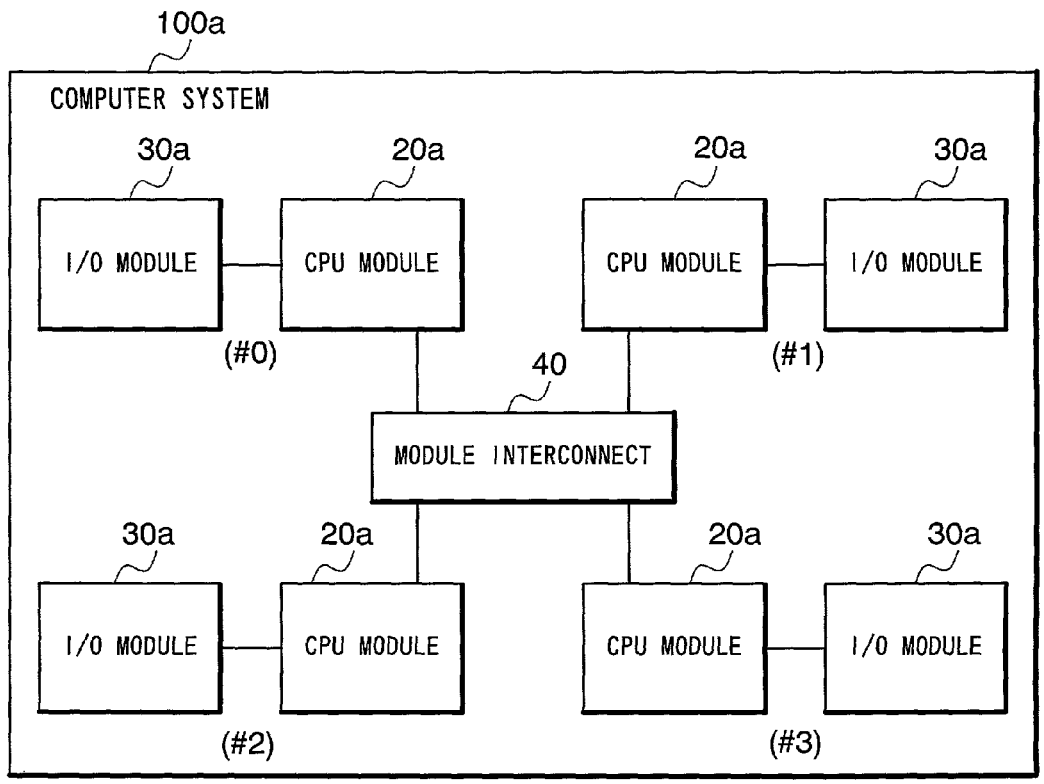
FIG. 18 is a block diagram showing the configuration of a conventional computer system.
Figure 19:
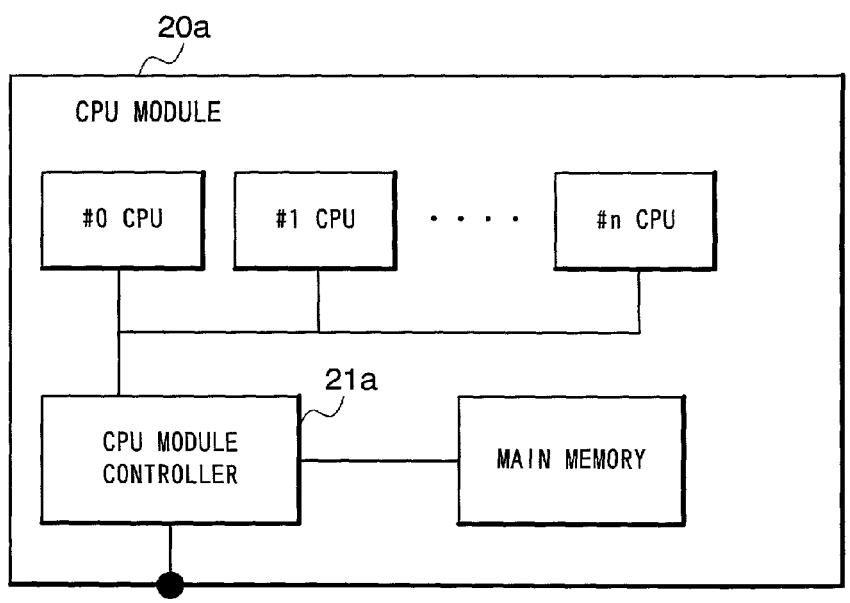
FIG. 19 is a block diagram showing the configuration of a conventional CPU module.

Furthermore, in a system as shown in FIG. 17, wherein a plurality of CPU modules 20 and a plurality of I/O modules 30 are connected to dual networks, and a set of CPU modules 20 and a set of I/O modules 30 are placed in a group, each group forming a computer and, when viewed from a system-wide viewpoint, each group also forming a cluster system connected with other groups via networks, it becomes possible to prevent system down as a result of a single network failure by implementing the means of the present invention.

In the configuration of FIG. 17, wherein each of the CPU modules 20 within a first computer is to perform I/O access to an I/O module on the own computer side, each of the CPU modules 20 performs a series of actions, comprising sending identical packets to both the ports of the corresponding I/O module 30, and, at the input port part of the I/O module 30, adopting the packet which has arrived first and which has no errors detected among the packets which the CPU module 20 has sent to each of the output ports, and performing an error check on packets arriving later and discarding them after confirming that no network failure has occurred.

Thus even in a large-scale cluster system via networks, system down due to a single failure in any of the networks can be prevented by adapting the present invention. As described in the foregoing, the larger the scale of a system is, the greater effectiveness the present invention shows, since the failure rate for a CPU-I/O path increases with its length.

While the present invention has been described by taking preferred embodiments and other embodiments as examples, it should be noted that the present invention is not limited to the preferred embodiments and other embodiments described above and that it can be embodied with a variety of modifications without departing from the spirit and scope of its technical principle.

For example, in relation to the embodiments above, a system has been described wherein CPU modules 20 and I/O modules 30 exchange data mutually by packet transfer, the present invention can also be applied to systems with configurations wherein modules on one side transmits data unidirectionally to modules on the other side. In this case, each of the transmitting modules is provided with an output controlling part and each of the receiving modules is provided with an input controlling part.

As clearly known from the descriptions above, the employment of a computer system of the present invention will lead to various effects as described below.

A computer system of the present invention can realize extremely high availability by multiplexing communication paths between modules, thereby eliminating system down or other incidents due to corrupted packets caused by failures on CPU-I/O paths. Furthermore, since each module identifies whether a packet received from each communication path is new or not and captures the newest packet only, the computer system can realize high availability without sacrificing communication speed.

Finally, a computer system of the present invention can attain high availability without needing to add some special new functions to its operation system, operation software, and/or other elements because software-level control, e.g., packet retransmission, is not required.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A computer system that transfers data in packets mutually between a plurality of modules, comprising:

a first module and a second module which are connected by at least two communication paths, said first and second modules transmitting and receiving packets via the communication paths, wherein the first module duplicates a packet to be transmitted into a plurality of duplicate packets and transmits each of said plurality of duplicate packets of the packet to be transmitted to the second module by a different one of the communication paths, wherein the second module comprises a packet loss detection circuit and error detection circuit, which respectively check each of said plurality of duplicate packets received at the second module by the different one of the communication paths for packet loss and error, wherein the second module further comprises a packet selector circuit that determines which of the plurality of duplicate packets arrives first in time at the second module and selects a first received packet among the plurality of duplicate packets, the first received packet being determined as the duplicate packet arriving first in time from the first module, said packet selector circuit discarding the duplicate packets not arriving first in time after the packet loss detection circuit and error detection circuit check each of the plurality of duplicate packets for packet loss and error, wherein the packet loss detection circuit and error detection circuit of the second module disconnect one of the communication paths if packet loss or transmission error are detected in the plurality of duplicate packets received via the one of the communication paths and checked by the packet loss detection circuit and error detection circuit prior to being discarded by the packet selector circuit such that the disconnected one of the communication paths is not used to transmit the packets from the first module to the second module.

2. The computer system as set forth in claim 1,
wherein each of the first and second modules comprises
an output controlling part for duplicating the packet to be transmitted and outputting said plurality of duplicate packets on the at least two communication paths, and
an input controlling part for identifying said plurality of duplicate packets that have been received from the at least two communication paths and selecting the first received packet only.

3. The computer system as set forth in claim 1, wherein said first and second modules comprises
a CPU module and an I/O module that transfer data in packets mutually.

4. The computer system as set forth in claim 2, wherein said output controlling part comprises
a means for assigning identification information to the packet to be transmitted for identifying said packet to be transmitted uniquely, and a means for duplicating said packet with said identification information and outputting said plurality of duplicate packets, and
said input controlling part comprising
a selecting means for identifying said identification information of the plurality of duplicate packets which are received, selecting the first received packet among said plurality of duplicate packets to which a same identification information has been, assigned, and discarding any packet of said plurality of duplicate packets which is not first received.

5. The computer system as set forth in claim 1,
wherein a switching module is provided between said first and second modules for performing switching of the at least two communication paths.

6. The computer system as set forth in claim 1, wherein said first and second modules are connected with one another via a communication network.

7. The computer system as set forth in claim 1, wherein at least the first and second modules are connected directly via the communication paths on a one-to-one basis.

8. A communication method that transfers data in packets mutually between a plurality of modules within a computer system, comprising the steps of:
duplicating, at a transmitting module, a packet to be transmitted into a plurality of duplicate packets and transmitting each of said plurality of duplicate packets of the packet to be transmitted to a receiving module by a different communication path,
checking, at the receiving module, each of said plurality of duplicate packets received at the receiving module by the different communication paths for packet loss and error,
determining, at the receiving module, which of the plurality of duplicate packets arrives first in time at the receiving module,
selecting, at the receiving module, a first received packet among the plurality of duplicate packets, the first received packet being determined as the duplicate packet arriving first in time from the transmitting module,
discarding the duplicate packets not arriving first in time after each of the plurality of duplicate packets have been checked for packet loss and error, and
disconnecting one of the different communication paths if packet loss or transmission error are detected in checking the plurality of duplicate packets received via the one of the different communication paths for packet loss and error prior to being discarded such that the disconnected one of the different communication paths is not used to transmit the packets from the transmitting module to the receiving module.

9. The communication method as set forth in claim 8, wherein
said selecting comprises
identifying said plurality of duplicate packets which are received and selecting the first received packet only.

10. The communication method as set forth in claim 8, wherein
said duplicating and transmitting comprises
assigning identification information to the packet to be transmitted for identifying said packet to be transmitted uniquely,
duplicating said packet to be transmitted with said identification information and outputting said plurality of duplicate packets on at least two communication paths, and
said selecting comprises identifying said identification information of the plurality of duplicate packets which are received, selecting the first received packet among said plurality of duplicate packets to which a same identification information has been assigned, and discarding any packet of said plurality of duplicate packets which is not first received.

11. A receiving module that receives data transmitted in packets via a plurality of communication paths, comprising:
an input controlling part that receives a plurality of duplicate packets, which were duplicated by a transmitting module and each of said duplicate packets transmitted by a different one of the communication paths connecting the transmitting module to the input controlling part of the receiving module,
a packet loss detection circuit and error detection circuit, which respectively check each of said plurality of duplicate packets received at the input controlling part of the receiving module by the one of the different communication paths for packet loss and error, and
a packet selector circuit that determines which of the plurality of duplicate packets arrives first in time at the receiving module and selects a first received packet among the plurality of duplicate packets, the first received packet being determined as the duplicate packet arriving first in time from the transmitting module, said packet selector circuit discarding the duplicate packets not arriving first in time after the packet loss detection circuit and error detection circuit check each of the plurality of duplicate packets for packet loss and error,
wherein the packet loss detection circuit and error detection circuit disconnect one of the communication paths if packet loss or transmission error are detected in the plurality of duplicate packets received via the one of the communication paths and
checked by the packet loss detection circuit and error detection circuit prior to being discarded by the packet selector circuit such that the disconnected one of the communication paths is not used to transmit the packets from the transmitting module to the receiving module.

* * * * *

UNITED STATES PATENT AND TRADEMARK OFFICE
CERTIFICATE OF CORRECTION

PATENT NO.       : 7,844,730 B2
APPLICATION NO.  : 10/061242
DATED            : November 30, 2010
INVENTOR(S)      : Shinichi Kawaguchi Page 1 of 5

It is certified that error appears in the above-identified patent and that said Letters Patent is hereby corrected as shown below:

In the Drawings:

Sheet 2 of 19 (Below Box 31) (FIG. 3): Below "Box 31" insert -- I/O ADAPTER --

Figure 20:
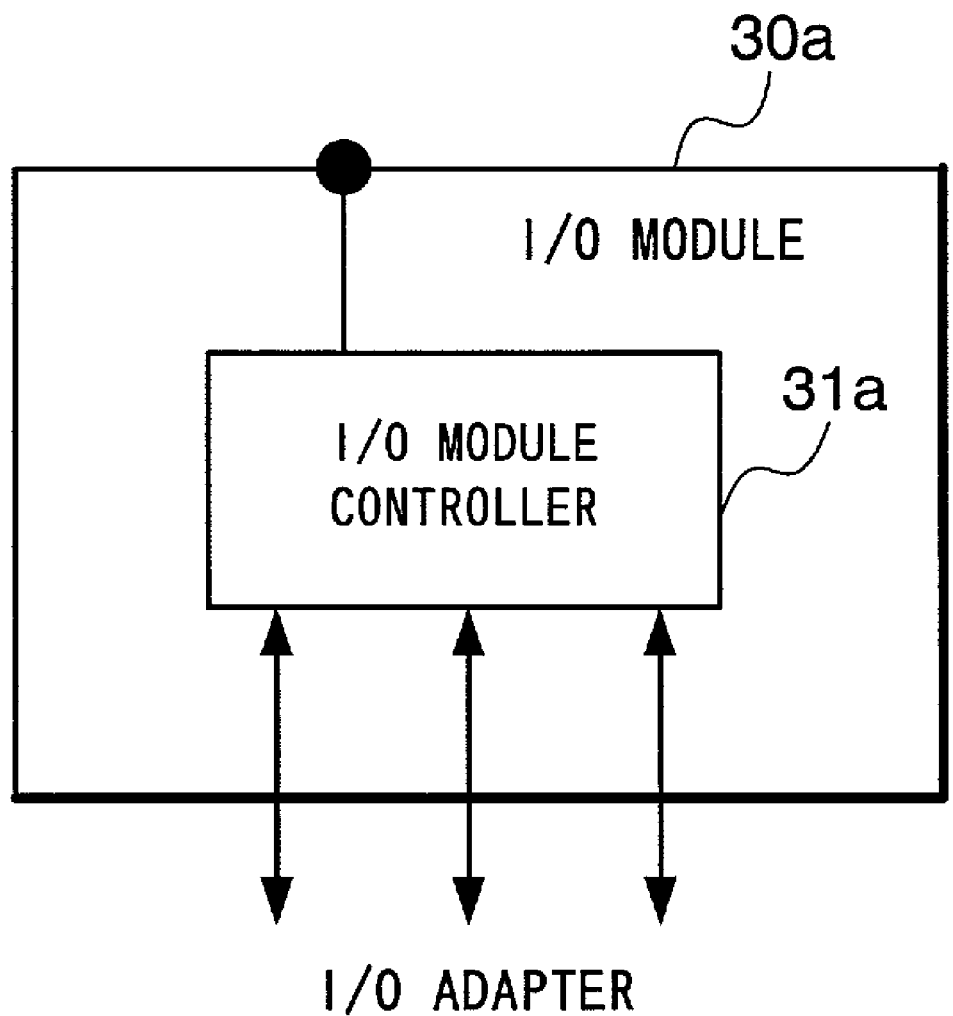
FIG. 20 is a block diagram showing the configuration of a conventional I/O module.

Sheet 17 of 19 (FIG. 20): After "FIG. 20" insert -- (PRIOR ART) --

Figure 21:
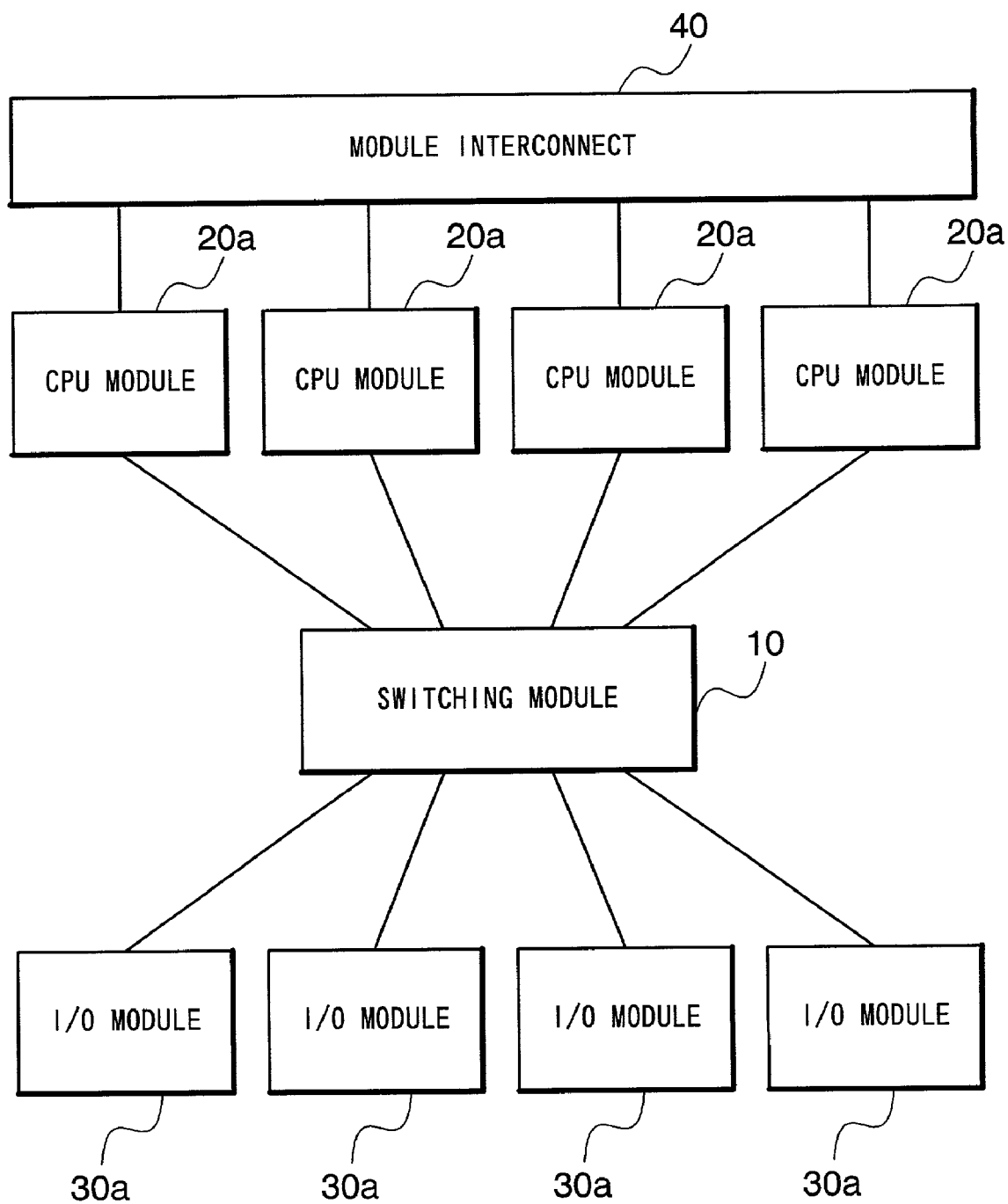
FIG. 21 is a block diagram showing the configuration of a conventional computer system that connects the I/O module and the CPU module via a switching module.

Sheet 18 of 19 (FIG. 21): After "FIG. 21" insert -- (PRIOR ART) --

Figure 22:
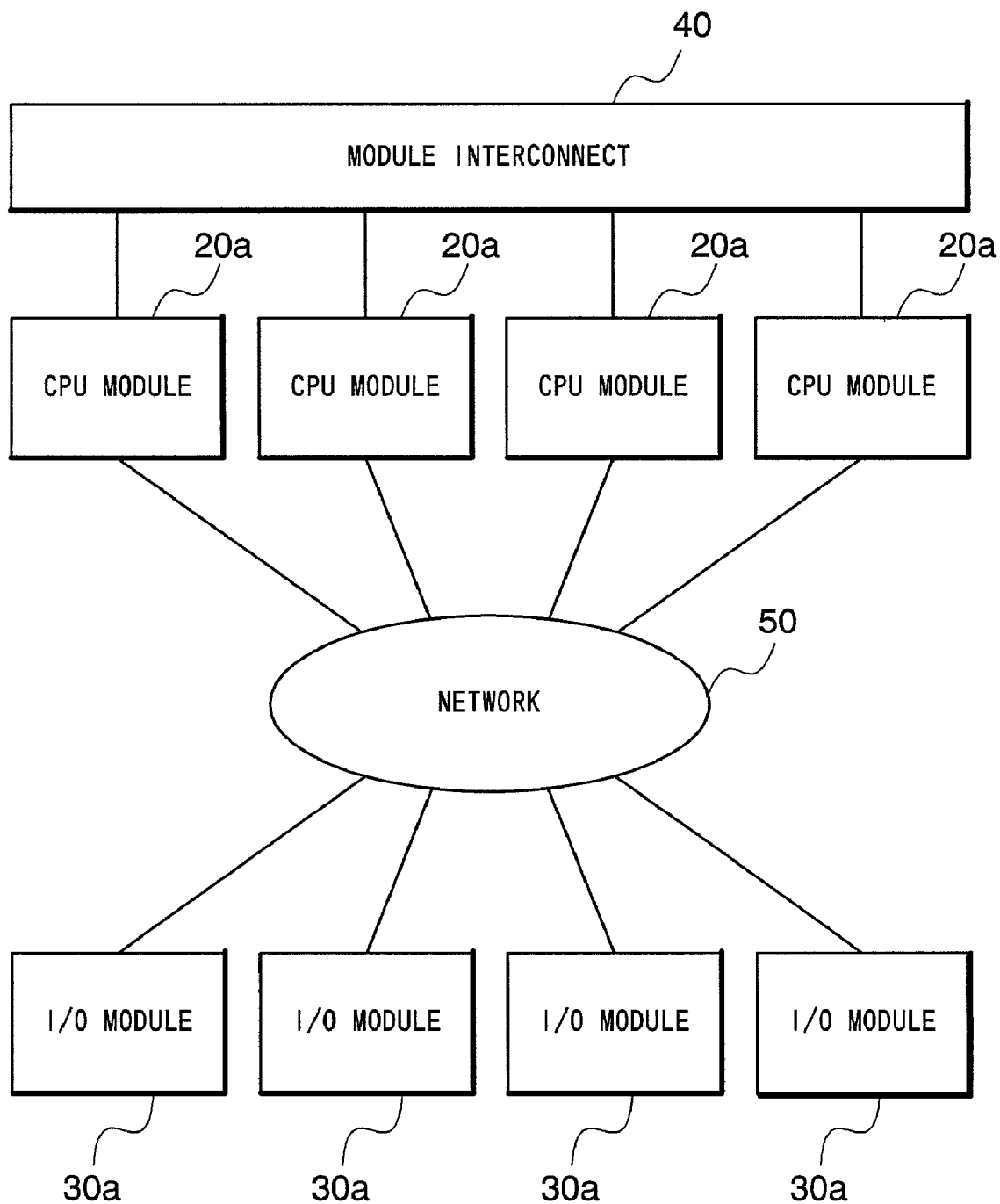
FIG. 22 is a block diagram showing the configuration of a conventional computer system that connects the I/O module and the CPU module via a communication network.
Figure 2:
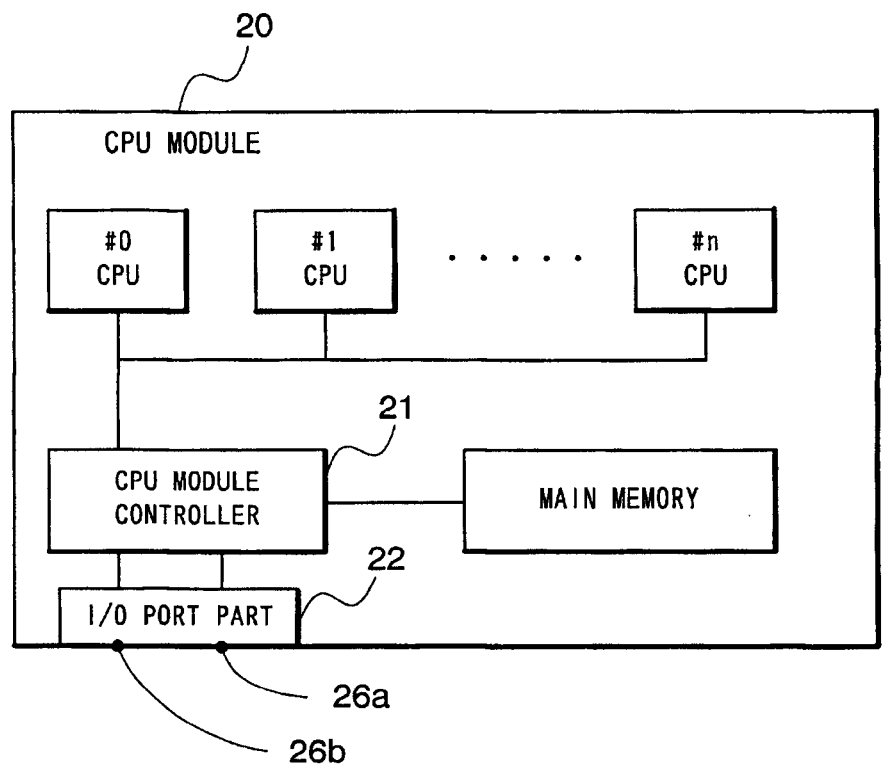
Figure 3:
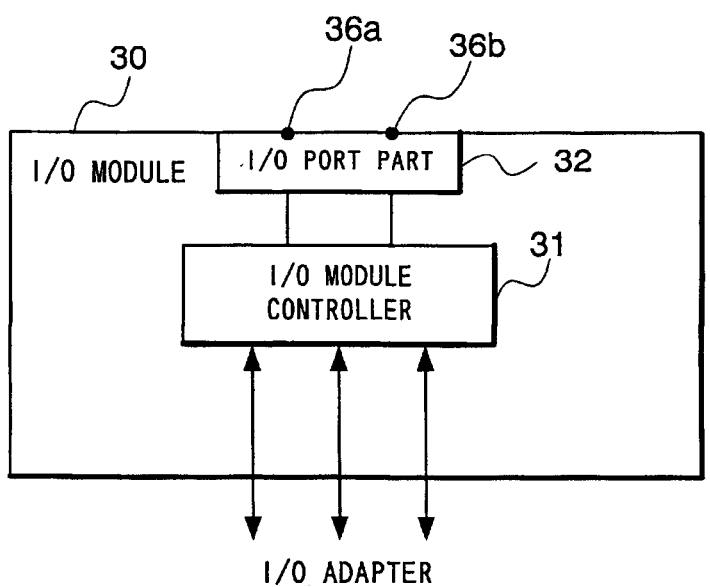
Figure 20:
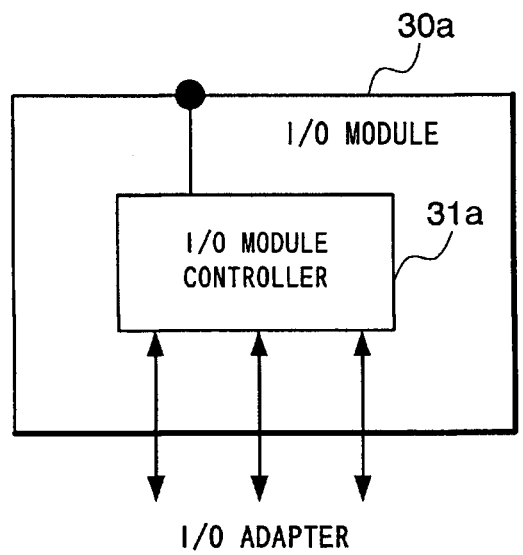
Figure 21:
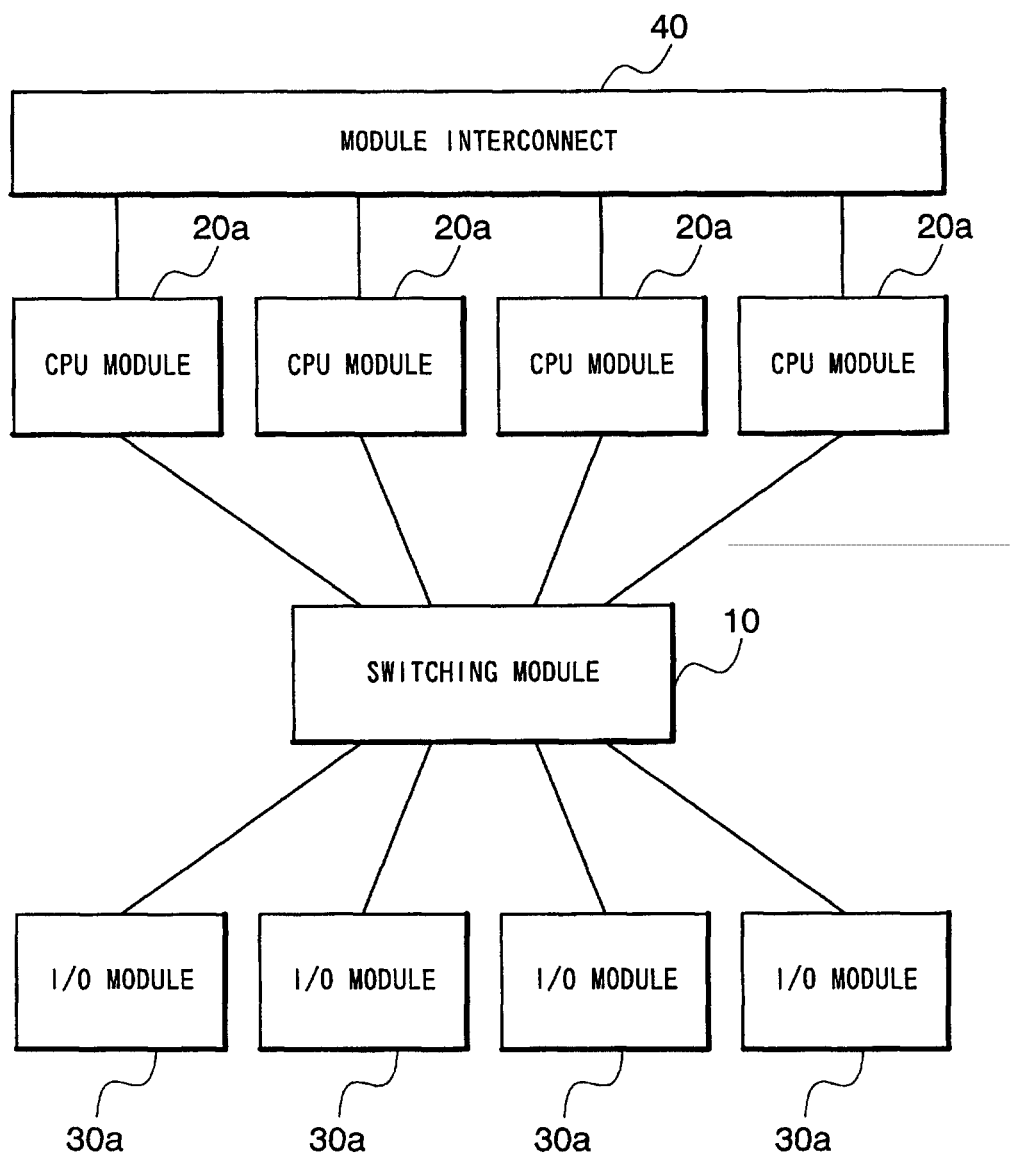
Figure 22:
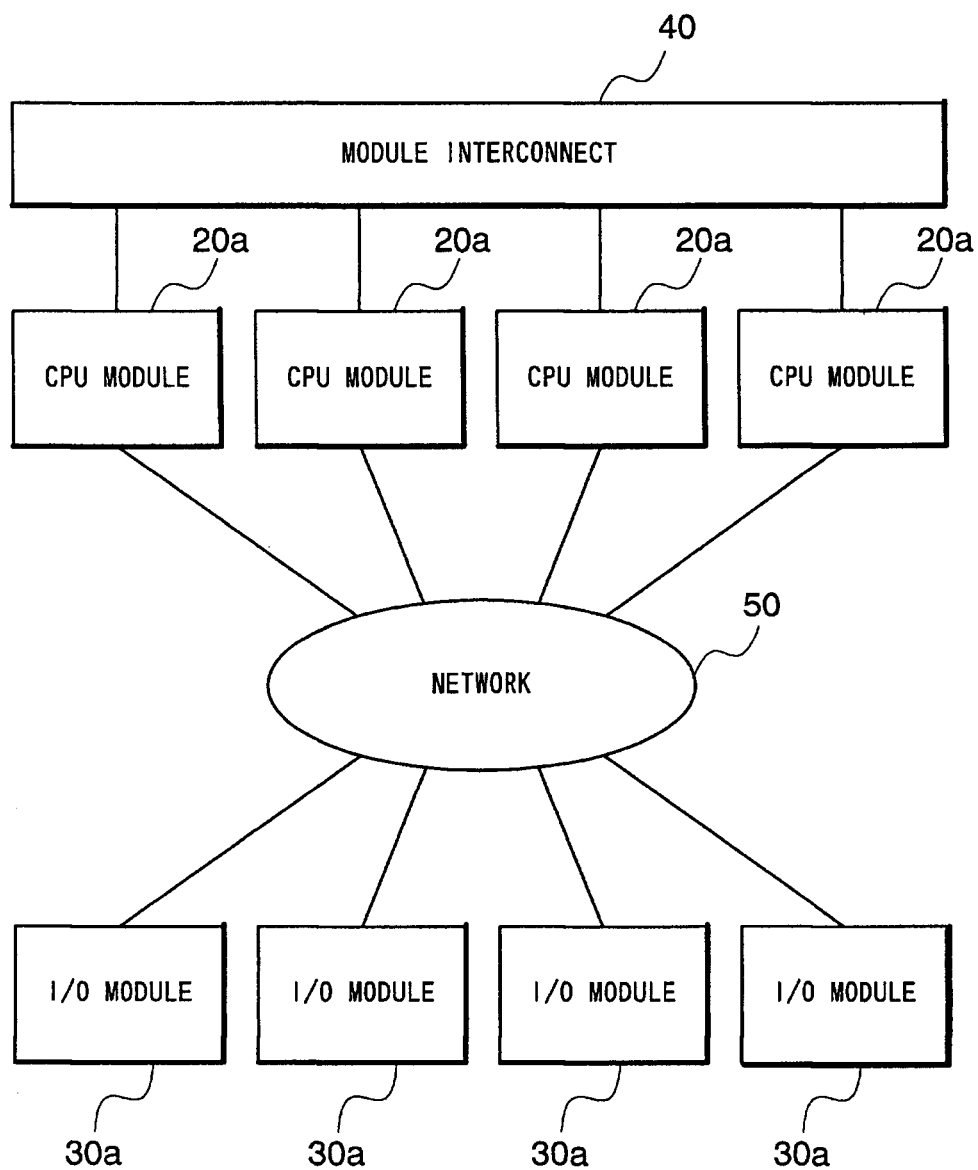

Sheet 19 of 19 (FIG. 22): After "FIG. 22" insert -- (PRIOR ART) --

In the Specifications:

Column 3, Line 19: delete "paths," and insert -- paths. --

Column 12, Line 31: delete "embodies" and insert -- embodied --

Signed and Sealed this
Twelfth Day of July, 2011

David J. Kappos
*Director of the United States Patent and Trademark Office*